United States Patent
Schmidtler et al.

(10) Patent No.: US 12,265,907 B2
(45) Date of Patent: Apr. 1, 2025

(54) SYSTEM AND METHOD FOR PREDICTING DOMAIN REPUTATION

(71) Applicant: OPEN TEXT INC., Menlo Park, CA (US)

(72) Inventors: Mauritius Schmidtler, Escondido, CA (US); Chahm An, Poway, CA (US); Hal Case Lonas, Jr., Carlsbad, CA (US); Catherine Yang, San Diego, CA (US); Trung Tran, Santee, CA (US); Kiran Kumar, San Diego, CA (US)

(73) Assignee: OPEN TEXT INC., Menlo Park, CA (US)

( * ) Notice: Subject to any disclaimer, the term of this patent is extended or adjusted under 35 U.S.C. 154(b) by 505 days.

(21) Appl. No.: 16/866,020

(22) Filed: May 4, 2020

(65) Prior Publication Data

US 2020/0349430 A1 Nov. 5, 2020

Related U.S. Application Data

(60) Provisional application No. 62/842,717, filed on May 3, 2019.

(51) Int. Cl.
*G06F 3/08* (2006.01)
*G06N 3/08* (2023.01)
*G06N 5/02* (2023.01)

(52) U.S. Cl.
CPC .............. *G06N 3/08* (2013.01); *G06N 5/02* (2013.01)

(58) Field of Classification Search
CPC .... G06F 40/211; G06F 40/253; G06F 40/268; G06F 40/284; G06F 40/30; G06F 21/56; G06N 20/00
See application file for complete search history.

(56) References Cited

U.S. PATENT DOCUMENTS

| | | | | |
|---|---|---|---|---|
| 9,462,009 | B1 * | 10/2016 | Kolman | H04L 63/1425 |
| 10,135,785 | B2 * | 11/2018 | Rolette | H04L 63/0236 |
| 10,574,681 | B2 * | 2/2020 | Meshi | G06N 20/00 |
| 10,778,702 | B1 * | 9/2020 | Huang | H04L 63/0236 |
| 11,106,715 | B1 * | 8/2021 | Ju | G06N 5/046 |
| 2008/0222726 | A1 * | 9/2008 | Chayes | G06F 16/951 726/23 |
| 2008/0270203 | A1 * | 10/2008 | Holmes | G06Q 30/0201 705/7.29 |
| 2010/0274836 | A1 * | 10/2010 | Orentas | H04L 43/08 709/203 |
| 2012/0158626 | A1 * | 6/2012 | Zhu | G06F 21/56 726/22 |
| 2014/0096194 | A1 * | 4/2014 | Bhogavilli | H04L 63/0236 726/3 |
| 2014/0208394 | A1 * | 7/2014 | Goodwin | H04L 9/3247 726/4 |

(Continued)

*Primary Examiner* — Lamont M Spooner
(74) *Attorney, Agent, or Firm* — Sprinkle IP Law Group

(57) ABSTRACT

A computer system comprising a processor and a memory storing instructions that, when executed by the processor, cause the computer system to perform a set of operations. The set of operations comprises collecting domain attribute data comprising one or more domain attribute features for a domain, collecting sampled domain profile data comprising one or more domain profile features for the domain and generating, using the domain attribute data and the sampled domain profile data, a domain reputation assignment utilizing a neural network.

19 Claims, 10 Drawing Sheets

(56) References Cited

U.S. PATENT DOCUMENTS

| | | | |
|---|---|---|---|
| 2014/0236953 A1* | 8/2014 | Rapaport | G06F 16/285 |
| | | | 707/740 |
| 2015/0128274 A1* | 5/2015 | Giokas | H04L 51/212 |
| | | | 726/23 |
| 2015/0213131 A1* | 7/2015 | Styler | H04L 61/4511 |
| | | | 707/767 |
| 2015/0237068 A1* | 8/2015 | Sandke | H04L 63/1425 |
| | | | 726/23 |
| 2016/0065597 A1* | 3/2016 | Nguyen | H04L 63/1441 |
| | | | 726/22 |
| 2017/0041333 A1* | 2/2017 | Mahjoub | H04L 43/0876 |
| 2017/0251013 A1* | 8/2017 | Kirti | H04L 63/1441 |
| 2017/0318035 A1* | 11/2017 | Baughman | G06N 3/044 |
| 2018/0052936 A1* | 2/2018 | Cora | G06F 16/9535 |
| 2018/0124110 A1* | 5/2018 | Hunt | G06F 16/951 |
| 2018/0165607 A1* | 6/2018 | Hagen | G06N 7/01 |
| 2018/0196881 A1* | 7/2018 | Lundin | G06F 16/9535 |
| 2018/0219888 A1* | 8/2018 | Apostolopoulos | G06F 21/554 |
| 2018/0227321 A1* | 8/2018 | Freund | H04L 63/1416 |
| 2018/0336353 A1* | 11/2018 | Manadhata | G06F 16/3334 |
| 2018/0351972 A1* | 12/2018 | Yu | H04L 63/1416 |
| 2019/0109864 A1* | 4/2019 | Eren | H04W 12/12 |
| 2019/0132344 A1* | 5/2019 | Lem | G06N 20/00 |
| 2019/0141067 A1* | 5/2019 | Rodriguez | G06N 3/084 |
| 2019/0164086 A1* | 5/2019 | Amit | H04L 63/1416 |
| 2019/0273509 A1* | 9/2019 | Elkind | H03M 7/4093 |
| 2019/0273510 A1* | 9/2019 | Elkind | H03M 7/4093 |
| 2020/0259851 A1* | 8/2020 | Manoselvam | H04L 63/1441 |
| 2021/0120013 A1* | 4/2021 | Hines | G06N 3/045 |
| 2021/0342723 A1* | 11/2021 | Rao | G06Q 40/12 |

\* cited by examiner

SYSTEM AND METHOD FOR PREDICTING DOMAIN REPUTATION

RELATED APPLICATIONS

The present application claims the benefit of priority under 35 U.S.C. § 119(e) to U.S. Provisional Patent Application No. 62/842,717, entitled "Prediction of Domain Reputation," filed May 3, 2019, which is hereby fully incorporated herein by reference for all purposes.

TECHNICAL FIELD

The present application relates generally to computer networks. In particular, but not by way of limitation, embodiments relate to techniques for predicting the reputations of domains. Even more particularly, but not by way of limitation, embodiments relate to techniques for predicting whether a domain is used to host malicious or undesirable content.

BACKGROUND

The World Wide Web is a vast and continuously growing computer network resource that may be used to host malicious content. In order to protect users from harmful attacks such as phishing or malware downloads, it is important to quickly and accurately determine the security risk of visiting a website. Due to the highly dynamic nature of the Web, where an arbitrarily large amount of new content may be introduced on a given day, it is difficult to efficiently identify dangerous communications.

Domain-based solutions, which focus on current Domain Name System (DNS) records associated with domains, may be utilized to recognize malicious domains. However, such solutions are limited because they focus on the publicly available DNS records and do not incorporate the history of relevant events that have previously been observed for the domain. Other solutions are based entirely on a lookup of existing domains that have been previously established to host malicious content. Such solutions are likely unable to predict the security risk of web content on new domains before malicious activities have already been observed.

Adding to the complexity identifying security risks, encrypted network protocols that obfuscate content—protocols such as HTTPS and S/MIME—have become standard in modern web traffic. Despite the intent of ensuring safe transit of information to and from a trusted website, such protocols do little to validate that the content of certified websites is trustworthy. In secure protocols that obfuscate content, the underlying content is typically not available for risk assessment. For example, a protocol that obfuscates content may prevent DNS-based filtering or packet inspection techniques from properly assessing content. Cybercriminals may take advantage of the encryption of the protocol to obfuscate their malicious content under the façade of a secure connection.

SUMMARY

The described technology assesses the risk of accessing the web content under a domain or served through a domain directly on the domain level and makes the risk assessment available to be used for automated blocking of communications with malicious domains.

For example, one embodiment of the disclosed technology relates to a computer system comprising at least one processor and a memory storing instructions that, when executed by the at least one processor, cause the computer system to perform a set of operations. According to one embodiment, the set of operations comprises collecting domain attribute data comprising one or more domain attribute features for a domain, collecting sampled domain profile data comprising one or more domain profile features for the domain, and generating, using the domain attribute data and the sampled domain profile data, a domain reputation assignment utilizing one or more neural networks.

Another embodiment provides a computer program product comprising a non-transitory computer readable medium having embodied thereon instructions executable by a processor for causing a computer to perform a set of operations. According to one embodiment, the set of operations comprises collecting domain attribute data comprising one or more domain attribute features for a domain, collecting sampled domain profile data comprising one or more domain profile features for the domain, and generating, using the domain attribute data and the sampled domain profile data, a domain reputation assignment utilizing one or more neural networks.

Yet another embodiment includes a method that comprises collecting, by a computer system, domain attribute data comprising one or more domain attribute features for a domain; collecting, by the computer system, sampled domain profile data comprising one or more domain profile features for the domain; and generating, by the computer system, using the domain attribute data and the sampled domain profile data, a domain reputation assignment utilizing a neural network.

According to one embodiment, the sampled domain profile data comprises a set of probabilistic values generated based on: statistics of prior observations on the domain; responses from active probing of content; and security-related aspects of the domain.

According to one embodiment, the neural network comprises a profile prediction trainer and a reputation trainer.

According to one embodiment, the one or more domain attribute features comprise one or more attribute features selected from a group consisting of: a domain name, a domain registrar, a domain name server, a domain creation date, an identity of a certificate issuer, a certificate issuance date, a certificate alternate name, a certificate expiration date, a domain IP address, and an associated geographic location.

The one or more domain profile features may comprise, according to one embodiment, a user event feature and a probed event feature. By way example, but not limitation, the user event feature comprises at least one feature selected from the group consisting of: request volume, number of unique URLs, number of malware threats detected, number of phishing threats detected, number of new threats detected, frequency of malicious activity, and percent of malicious pages. Similarly by way of example, and not limitation, the probed event feature may comprise at least one feature selected from the group consisting of: number of unique pages discovered, classification of unique pages discovered, a scan of open network ports and services, an HTTP server process, an HTTP server version, an HTTP header, volatility of hosted content, and network communication latency.

In accordance with one aspect, generating the domain reputation assignment utilizing the neural network comprises generating, using a first neural network, predicted domain profile features across multiple points in time, based on a current observation of domain features and a recurrent domain state determined by the first neural network from a previous evaluation. The current observation of domain features may include a current observation of the one or more domain attribute features and a current observation of the one or more domain profile features. Generating the domain reputation assignment utilizing the neural network may further comprise generating, using a second neural network based on the predicted domain profile features generated across the multiple points in time, a predicted domain reputation for the domain across the multiple points in time.

In another example, the disclosed technology relates to another computer system comprising at least one processor and memory storing instructions that, when executed by the at least one processor, cause the computer system to perform a set of operations for characterizing a domain for potential security threats. According to one embodiment, the set of operations comprises collecting, for a domain, one or more domain attribute features and one or more domain profile features; generating, using a first neural network, predicted domain profile features across multiple points in time, based on: a current observation of domain features and a recurrent domain state determined by the first neural network from a previous evaluation; and generating, using a second neural network based on the predicted domain profile features, a predicted domain reputation for the domain across multiple points in time.

According to one embodiment, the first neural network comprises an attribute feature extractor that generates domain attribute feature vectors from collected domain attribute features across multiple points in time.

According to one embodiment, at least one domain attribute feature of the one or more domain attribute features is variable length, and wherein the first neural network comprises a sequence autoencoder architecture. In one embodiment, the sequence autoencoder architecture comprises one of an autoregressive neural network architecture or a nested autoencoder architecture. Further according to one embodiment, the sequence autoencoder architecture comprises one of an autoregressive neural network architecture or a nested autoencoder architecture.

According to one embodiment, at least one domain attribute feature of the one or more domain attribute features is fixed length, and wherein the first neural network comprises one of a nested autoencoder architecture or a fully connected autoencoder architecture. It can be noted, however, some embodiments do not use a fixed-length attribute feature vectors.

According to one embodiment, the set of predicted domain profile features generated based on domain profile features collected at the given point in time are compared to actual domain profile features collected for the given point in time, to calculate a loss, which is backpropagated to the first neural network.

The loss may be calculated using a cross entropy loss function, calculated in accordance with the following formula:

$$\text{CrossEntropyLoss} = (\hat{\vec{y}} \log(\vec{y}) + (1-\hat{\vec{y}})\log(1-\vec{y}))$$

where the vector $\hat{\vec{y}}$ represents the set of predicted domain profile features for the given point in time, and the vector $\vec{y}$ represents the observed profile features for the same point in time.

According to one embodiment, the second neural network is a multilayer neural network that calculates a classification loss.

According to one embodiment, a cross entropy loss may be calculated and backpropagated to the second neural network, wherein the cross-entropy loss is calculated in accordance with the following formula:

$$\text{CrossEntropyLoss} = (\hat{\vec{r}} \log(\vec{r}) + (1-\hat{\vec{r}})\log(1-\vec{r}))$$

where the vector $\hat{\vec{r}}$ represents a predicted domain reputation for the given point in time, and the vector $\vec{r}$ represents and observed domain reputation for the same point in time.

According to one embodiment, the second neural network further comprises a filtering application. By way of example, but not limitation, the filtering application performs one or more of: blocking/allowing traffic to the domain; generating at least one of low risk, moderate risk, or high-risk message for the domain; or generating a warn status. According to one embodiment, the filtering application comprises a web security policy that blocks the domain if it matches risk criteria. According to one embodiment, the filtering application groups predictions for a set of domains into one or more risk profiles based on identifying a similarity in actual network threats.

In yet another example, the disclosed technology relates to a method for evaluating a domain to identify a potential security threat. According to one embodiment, the method comprises accessing, for a domain, a set of domain attribute features; accessing, for the domain, a set of domain profile features; generating a first set of feature vectors based on the set of domain attribute features for the domain; generating a second set of feature vectors based on the set of domain profile features for the domain; generating a third set of feature vectors of predicted domain profile feature data utilizing a machine learning model, from the first set of feature vectors and the second set of feature vectors; and generating a set of domain reputation values utilizing a machine learning model, based on the third set of feature vectors and based on sampled domain profile feature data to generate a loss that is backpropagated through the machine learning models.

In a further still example, the technology relates to a method for identifying a potential security threat for a domain. According to one embodiment, the method comprises generating, by a client computing device, a predicted reputation request to a server computing device, wherein he predicted reputation request comprises a domain name; receiving, in response to the predicted reputation request, a predicted domain reputation profile for the domain name; generating, using the received predicted domain reputation profile, a risk associated with the domain, wherein the risk is one of a low risk, a medium risk, or a high risk; and blocking a request for content from the domain, comprising generating a graphical indication of the risk associated with the domain.

BRIEF DESCRIPTION OF THE DRAWINGS

The drawings accompanying and forming part of this specification are included to depict certain aspects of the technology. It should be noted that the features illustrated in the drawings are not necessarily drawn to scale. A more complete understanding of the technology and the advantages thereof may be acquired by referring to the following description, taken in conjunction with the accompanying drawings in which like reference numbers indicate like features and wherein.

DETAILED DESCRIPTION

Figure 1:
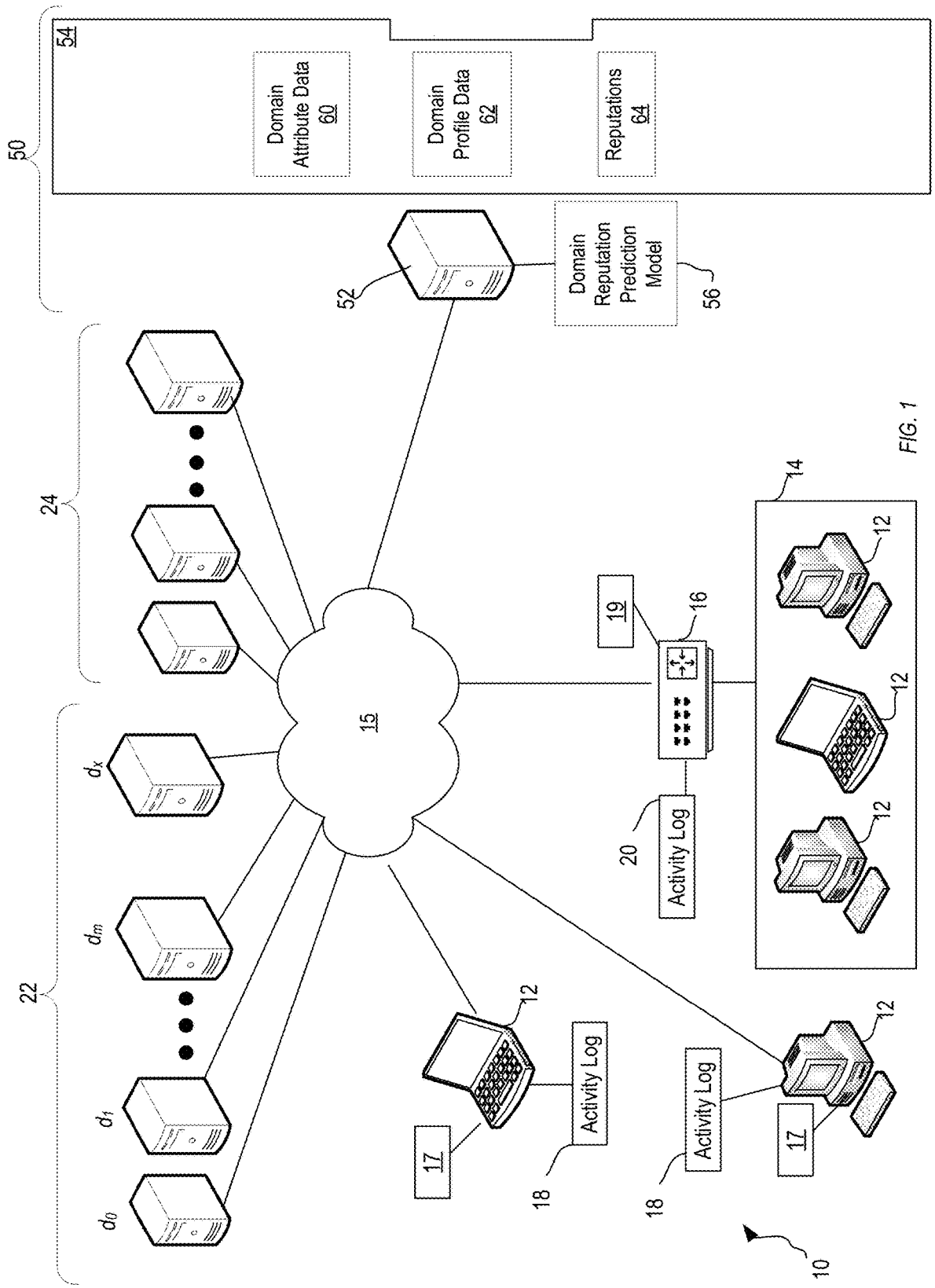
FIG. 1 is a diagrammatic representation of one embodiment of a network environment.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The present disclosure relates to methods, programs, systems, or services that protect a computer system or user of computer systems from malicious or unwanted communications during a web browsing session or other web-based communication such as web applications, among other examples. Example security applications include but are not limited to: automated blocking of phishing and other fraudulent websites, blocking of sites hosting malware scripts and executables, blocking of communications with botnet command and control servers, filtering of spam URLs and mail sources, and integration with advanced firewalls or intrusion detection systems.

Aspects described in the present disclosure address the challenges of identifying malicious or undesired content within large volumes of traffic on the World Wide Web where the content is encrypted or unavailable. Examples of these challenges include assessing the risk of web content associated with a domain without having the content available at the time of assessment and combining varied disparate information into a risk assessment. It will be appreciated that the problems and associated benefits described herein are provided as examples, and that, in other examples, the present aspects may provide other benefits.

Given the rate at which new content is introduced on the Web, an exhaustive crawl is likely infeasible. Embodiments of the present technology may incorporate a user event history. A "user event history" is a user history (e.g., a user history log) that provides a representative insight into the webpages visited on the World Wide Web by users. As a result, content of the World Wide Web can be sampled selectively from a domain. The sampled content is scanned to generate an expectation of the security profile time series of a given domain. In addition to sampling based on the user event history, additional information may be used, such as information gained by crawling the world wide web and active server scanning. Thus, as a result of sampling content from the World Wide Web, aspects of the present disclosure may be more computationally efficient than performing a continuous and exhaustive crawl of a domain. In this context, "sample" refers to a subset of data from a larger body of data. As an example, domain profile data is sampled to identify a subset of data relating to user event history for the domain. In other examples, a "sample" is a set of data relating to a time period. For example, a real-time sample of domain profile data may comprise a recent or contemporaneous set of user event history data.

Different modes of sampling may be used. For example, a sample comprising a subset of data may be used initially, thereby enabling faster processing and/or a larger breadth of data to be processed. Once a neural network is well-trained (e.g., exhibiting a calculated loss is below a threshold, an accuracy percentage is above a threshold, etc.), the sampling mode may transition to real-time sampling, thereby evaluating data associated with a domain name substantially contemporaneously with its generation. It will be appreciated that real-time is provided as an example and that, in other examples, data may be associated with a different time period.

Aspects of the disclosed technology enable rapid and accurate prediction of the risk of encountering malicious content on the World Wide Web. For example, some embodiments address limitations present in signature or content-based approaches through the use of a deep recurrent architecture to predict the expectation of encountering malicious activity on the given domain based on a behavioral profile that is evaluated at various windows of time. This behavioral profile is a collection of probabilistic values compiled from the statistics of prior observations on the domain (for example, which may be available through large databases of passively collected user history logs) and responses from active probing of content and other security-related aspects of the domain's public interface on the web.

In addition to the behavioral profile, aspects of the present technology may incorporate domain information present in publicly available sources of data relating to the domain or other sources of data related to the domain in a machine learning model. As will be appreciated, in order to utilize text-based data (such as those found in DNS records) in machine learning based classifiers such as neural networks, the text-based data may first be processed into a fixed-length representation. Example approaches for representing unstructured text data using neural networks include, but are not limited to, predominantly word-based models that use a context-based embedding or recurrent architecture encoder-decoder model to process sequential input. In general, these models are fixed vocabulary, context-dependent, and primarily used for machine translation tasks. Such approaches that rely on a fixed vocabulary are not well suited to processing DNS records of new domains due to the arbitrariness of domain names. Other example approaches include tweet2vec, which employs a character-level CNN-LSTM hybrid encoder-decoder architecture but is limited to sentiment categorization or semantic processing of natural language rather than domain names or related fields found from DNS or certificate queries.

To address the challenge of incorporating data from unstructured text fields, embodiments of the present technology may incorporate nested autoencoding learning architectures to extract features from unstructured text fields by encoding variable length character sequences associated with attributes for a domain (e.g., a domain name, along with other variable length domain-related information such as registration and certificate fields) as fixed-length expressions. As a result, the sequence of characters that comprises the domain name or related text fields may be encoded as a fixed-length vector of real-numbered values through use of an encoding model. These domain attribute features provide additional indicators of risk and also provide the basis of a prior probability of risk on a newly created domain where no historical events are available, which is common for domains that are created exclusively for malicious purposes.

Embodiments of the present technology can train and utilize a domain reputation prediction model to evaluate domain reputation. The domain reputation prediction model may combine, for example, one or more of (i) latent features learned from the domain name, registration information, certificate fields, IP address, historical records of user traffic on the domain, (ii) information obtained through active scanning for malicious content (e.g. malicious PE-files and scripts), or (iii) security attributes of data on the website. The domain reputation prediction model may be composed of a deep architecture that is both fully differentiable and includes modular components that can be trained independently.

Aspects described herein may leverage large amounts of behavioral data present in event logs of web surfers, annotated with content-based and signature-based threat intelligence that is available for training. In addition, embodiments of the present method use neural network based sequence modelling approaches both to encode the character sequences that may be present in the domain name, registration, and certificate information, and also to model the historical sequence of behavioral events observed for the domain as it changes through time. This composition of networks can result in a deep hierarchical architecture that facilitates efficient processing of the available information and also provides a basis for elucidating the component factors that contribute the most to a given risk evaluation.

To provide additional context, FIG. 1 is a diagrammatic representation of one embodiment of a network environment 10 that network threat prediction and blocking. In this example, network environment comprises client computing devices 12 bidirectionally coupled to a domain threat prediction system 50 by a communication network 15. Domain threat prediction system 50 comprises a server computing device 52 and a domain data store 54. Communications network 15 may represent a combination of wired and wireless networks that network computing environment may utilize for various types of network communications. In some instances, a client computing device is part of a protected network 14 that includes a network device 16, such as a firewall device, a server or other device to or through which communications between the protected network 14 and communications network 15 are routed. Client devices 12 or network device 16 may run security software (e.g., security software 17, security software 19) to provide data to or receive data from server computer device 52. For example, security software 17, 19 may send activity logs 18, 20 to server computing device 52, send predicted reputation requests to server computing device 52, receive predicted domain reputations from server computing device 52 and act on the predicted domain reputations.

Communications network 15 may include the public Internet. As such, network environment 10 may include any number of web domain host servers 22 hosting various domains. Moreover, network environment 10 may include various information provider systems 24 used to support the World Wide Web, such as, but not limited to, systems that may be queried for publicly available information, such as registry domain registry information, certificate information, and domain IP address information.

Network threat prediction system 50 may comprise a server computing device 52 that provides a service to evaluate domain reputations. For example, aspects of the present technology may be performed by the server computing device 52 in response to a predicted reputation request from a client computing device 12 (e.g., from security software 17). The request may comprise domain attribute data for a domain that the client computing device 12 accessed or that the client computing device 12 is currently attempting to access. In response, the server computing device 52 generates a domain reputation score and provides the generated score to the requesting client computing device 12. The client computing device 12 may then evaluate the received score and proceed accordingly (e.g., permitting access to the domain, denying access to the domain, generating an alert to a user, initiating a malware scan, etc.).

In another example, when network device 16 processes a request from a client computing device 12 on protected network 14 to access a domain, network device 16 can send server computing device 52 a predicted reputation request. In response, the server computing device 52 generates a domain reputation score and provides the generated score to network device 16. Network device 16 may then evaluate the received score and proceed accordingly (e.g., permitting access to the domain, denying access to the domain, generating an alert to a user, initiating a malware scan, etc.).

In some embodiments, server computing device 52 extracts features and trains models according to aspects described herein. In particular, server computing device 52 trains a domain reputation prediction model 56 to evaluate the domain reputation of web host domains. Embodiments of evaluating the domain reputation of a web host domain may use various types of information as input features, such as, for example, domain attribute data 60 and domain profile data 62. Domain attribute data 60 comprises relatively static features that contain text fields and addresses associated with the domain. Domain attribute data 60 may be collected from publicly available information, such as registry information, certificate information, and IP address information. Domain profile data 62 may include behavioral features obtained from historical records of known communication events with the domain from user event logs ("historical event features"). In addition, or in the alternative, domain profile data 62 may include information obtained through active scanning that includes one or both of crawled web content and server scanning ("current event features", where historical event features and current event features are collectively referred to as "domain profile features").

In some embodiments, a client computing device can generate user event logs 18 documenting the network activity of the respective client computing device 12 and send the user event log 18 to server computing device 52. In addition, or in the alternative, network device 16 may collect data regarding network activity in a user event log 20 and send the user event log 20 to server computing device 52. A user event log 18 or user event log 20 may include, for example, web requests and detected threats associated with real-time scanning of requested content or URLs. Thus, domain profile data 62 may include a user event history that provides a representative insight into the webpages visited on the world wide web from a set of domains $d_0 \ldots d_m$.

Server computing device 52 may selectively sample content of domains represented in the received user event logs and scan the content to determine if the content represents a threat and the type of threat represented to generate additional user event history data. Further server computing device 52 may crawl links in the sampled content to further retrieve additional content (crawled content), scan the crawled content for threats and generate crawler data. Server computing device 52 may further actively scan servers 22 associated with domains for security related information such as open ports and services and other information to generate server to generate server scanner data.

In some embodiments, domain profile data 62 includes data collected passively from observed historical user event features (including, by way of example and not limitation, historical user event logs of web requests and detected threats associated with real-time scanning of requested content or URLs) and actively probed event features discerned trough preemptive scanning and crawling of services to identify data that may be exposed to the Internet, but may be absent from historical user event logs.

For various domains, such as the domains represented in the user event logs, server computing device 52 collects a variety of domain attribute data 60 from information provider systems 24. Domain attribute data 60 for a domain may be collected from sources of information that are publicly available from services such as WHOIS and DNS or from the public interface of an HTTPS based web server that is hosted on the domain. Domain attribute data may include but, but is not limited to registrar information, certificate information, and IP address information.

Over time then, server computing device 52 may collect and update domain attribute data 60 and domain profile data 62 for domains $d_0 \ldots d_m$ represented in the user event logs from a potentially large number of users. Based on analysis of the contents of the domains, domains may be assigned reputations which may change over time. For example, each domain may be classified as malicious or non-malicious or be assigned other reputations.

Domain reputation prediction model 56 is trained using domain attribute data 60, domain profile data 62 and reputations 64 to predict the reputations of domains. Domain reputation prediction model 62 may combine domain features, for example, one or more of (i) latent features learned from the domain name, registration information, certificate fields, IP address, historical records of user traffic on the domain, (ii) information obtained through active scanning for malicious content, or (iii) security attributes of data on the website. Domain reputation prediction model 56 may be composed of a deep architecture that is both fully differentiable and includes modular components that can be trained independently. According to one embodiment, domain reputation prediction model may comprise one or more neural networks that implement, for example, a domain profile prediction model and a domain reputation assignment model.

Server computing device 52 may receive a predicted reputation request containing a domain name for a domain, say domain $d_x$. If other domain attributes for domain $d_x$ are not included in the request or already known as part of domain attribute data 60, server computing device 52 may collect additional domain attribute data for domain $d_x$ from information provider systems 24 and apply domain reputation prediction model 56 to the domain attribute data to generate a domain reputation score and return the domain reputation score. In other embodiments, server computing device 52 applies the domain reputation prediction model 56 to just the domain attribute data (e.g., domain name) in the predicted reputation request.

In some embodiments, server computing device 52 may provide domain reputation prediction model 56 to a client computing device 12 or network device 16, thereby enabling aspects of domain reputation assignment to be performed by the client computing device 12 or network device 16. While example operations are discussed with respect to a server computing device 52, a network device 16, and a client computing device 12, it will be appreciated that, in other examples, a different set of operations is performed by different devices. Server computing device 52 can be implemented on any number of computing devices, including a server farm. Further, any one or more aspects of the system 100 can be implemented in the cloud, or on a local computing device. Other embodiments will have other possible configurations as well.

Figure 2:
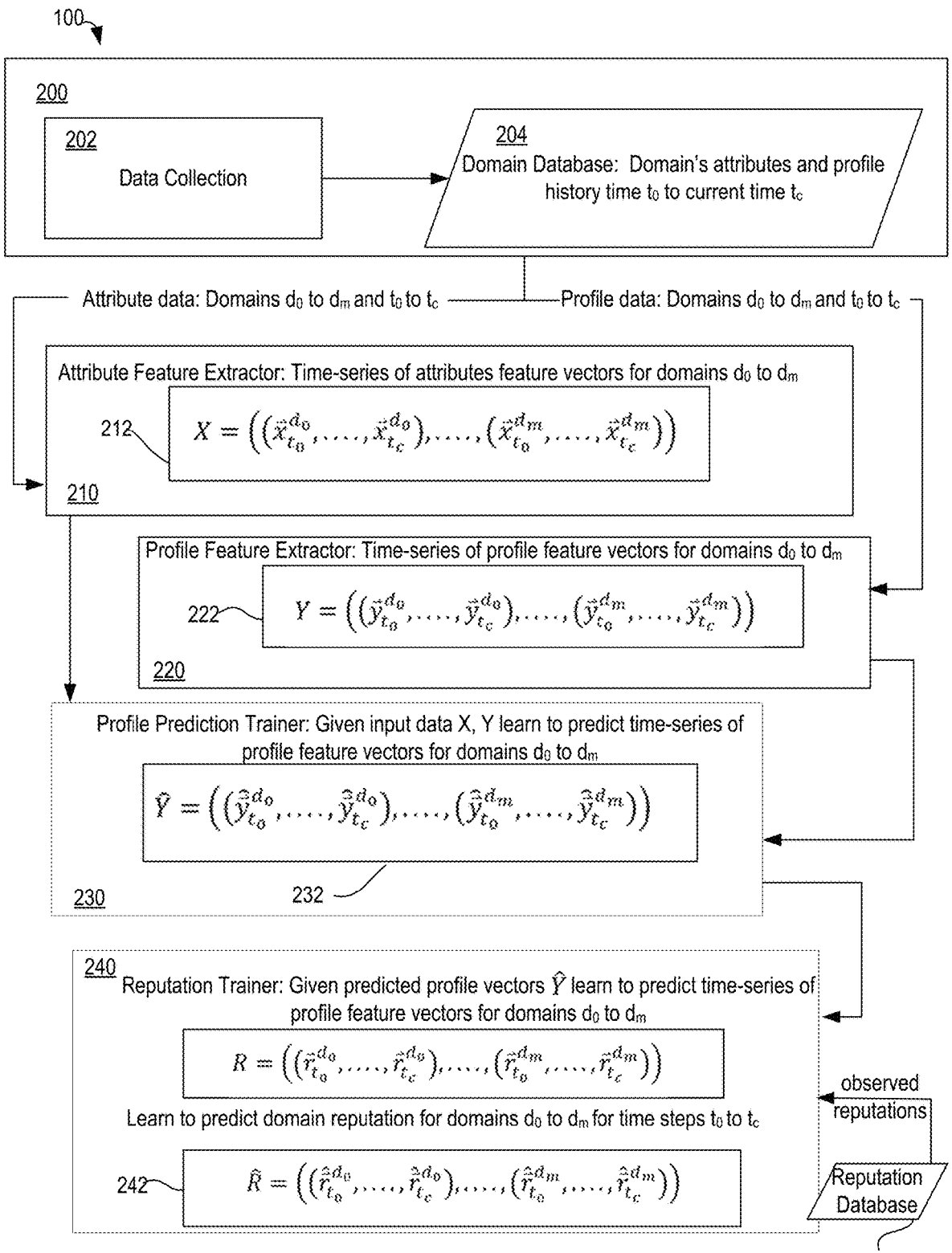
FIG. 2 is an overview of one embodiment of the model building process.

FIG. 2 is a functional block diagram illustrating one embodiment of a system for building a domain reputation prediction model, such as domain reputation prediction model 56. Specifically, FIG. 2 describes example data collection, feature extraction and model building components that may be used for one embodiment of the described technology. The application of the system, i.e. the determination of the predicted domain reputation for a given domain, utilizes parts of the components shown in FIG. 2. It will be appreciated that domain reputation may be determined contemporaneously with a user accessing the domain or, in other examples, the domain reputation is determined after the user accesses the domain.

As shown in FIG. 2, domain processing engine 200 may collect the domain attribute data and domain profile data (e.g., data collection block 202). As illustrated, domain processing engine 200 stores the domain attribute data and domain profile data in a domain database 204 or other domain data store. The data collection may be a continuous or periodic process starting from the initial time $t_0$ (the beginning of the data collection) to the current time $t_c$. For each time step, the data may be stored in the domain database (the domain database illustrated for domain processing engine 200 may contain domain attribute data and domain profile data for each domain $d_0$ to $d_m$ up to the current time $t_c$). In examples, the domain attribute data and domain profile data are collected by a server computing device, for example, by recording user events, crawling the Web and collecting information from publicly available sources. In other examples, domain processing engine 200 receives and aggregates at least a portion of domain attribute data or domain profile data from one or more client computing devices or one or more network devices.

Domain attribute feature extractor 210 receives domain attribute data for domains $d_0$ to $d_m$ for times $t_0$ to $t_c$. The domain attribute data may comprise a history of domain attribute data from $t_0$ to $t_c$, from the domain database 204, as may be generated by domain processing engine 200. Domain attribute feature extractor 210 extracts feature vectors from the attribute data and generates a time series of domain attribute feature vectors for each domain $d_0$ to $d_m$. Similarly, profile feature extractor 220 receives domain profile data for domains $d_0$ to $d_m$ for time $t_c$ to $t_0$. The domain profile data may comprise a history of domain profile data from $t_0$ to $t_c$, from the domain database 204, as may be generated by domain processing engine 200. Profile feature extractor 220 extracts profile feature vectors from the domain profile data and generates time series of domain profile feature vectors for each domain $d_0$ to $d_m$.

Profile prediction trainer 230 receives output generated by attribute feature extractor 210 and profile feature extractor 220. In examples, the received output is used as an input to train a first supervised machine learning model that predicts for each domain a time series of inferred profile feature vectors. Thus, profile prediction trainer 230 may train a domain profile prediction model 232. As an example, the input training data for the first machine learning model may be the time series of domain attribute feature vectors up to time $t_c$ and the time series of domain profile feature vectors up to time $t_{c-1}$. The output training data (e.g., training labels) for the supervised training may be derived from the time series of profile feature vectors up to time $t_c$. In one embodiment, profile prediction trainer 230 is implemented by a first neural network. Once the first neural network is sufficiently well-trained (e.g., exhibiting a calculated loss is below a threshold, an accuracy percentage above a threshold, etc.), the first neural network may be considered a trained machine learning model. For example, sampling may transition to real-time sampling, thereby evaluating data associated with a domain name substantially contemporaneously with its generation.

A reputation trainer 240 may have as an input the time series of domain attribute feature vectors and the time series of domain profile feature vectors to train a second supervised machine learning model, more particularly a domain reputation assignment model 242 that predicts domain reputation. In some embodiments, the input training data for the domain reputation assignment model 242 may be the time series of inferred profile feature vectors (e.g., as may be generated by profile prediction trainer 230), whereas the labels of the training data may be given by a time series of observed domain reputations. In one embodiment, reputation trainer 240 is implemented by a second neural network. Once the second neural network is sufficiently well-trained (e.g., exhibiting a calculated loss is below a threshold, an accuracy percentage above a threshold, etc.), the second neural network may be considered a trained machine learning model. For example, sampling may transition to real-time sampling, thereby evaluating data associated with a domain name substantially contemporaneously with its generation.

In some examples, features may be evaluated as a time series that is used as sequential input to a recurrent neural network. A recurrent neural network (RNN) is a deep neural network architecture designed to model sequential inputs, where subsequent layers each take in successive units of input and are also connected through passing of a hidden state vector. In a fully recurrent architecture, these layers and their connections can be described as a directed cyclic graph where each layer shares common weights and the node's output makes a recurrent connection back to itself. The output of this recurrent model may be a sequence of probability values, that represent the probability of encountering malicious content on the web domain given the combination of static and historical data. This data may be compared against the frequency of malicious and benign web requests observed within the given time window to calculate the loss to be minimized when learning the parameters of the neural network.

An RNN architecture may be well suited both for modeling temporal dynamic behavior and also for modelling static sequences of tokens, such as unstructured text. Examples of such RNNs include (i) the Long short-term memory (LSTM) network, which is a specific type of RNN architecture that maintains memory cells that are protected by a number of gates constructed in a way to mitigate the vanishing gradient problem (which normally inhibits learning of relationships between input units that are separated in sequence by long distances); and (ii) Gated recurrent unit (GRU) models (that have a recurrent architecture with memory states protected by gates in a similar way to LSTMs but use fewer parameters). LSTMs and GRUs are well-suited to applications that require modeling of sequence information such as speech and handwriting recognition as well as text-based tasks such as machine translation and language modeling. According to one embodiment LSTMs are used for modeling the time series of input domain features. It will be appreciated that other architectures may be used.

According to one embodiment, the domain profile features may be processed by profile feature extractor 220 at sequential points in time by domain profile risk calculators. Since, in one embodiment, domain profile features are fixed length, no encoding from variable length text to a fixed length feature vector is necessary for these features. Observed events from the domain profile data for a domain may be compiled into a plurality of probability values, which may be processed by profile prediction trainer 230 and reputation trainer 240. The probability values may represent the likelihood of observing various security-related behaviors (e.g., as determined from the domain profile data), such a phishing attack or malware download, during the given time window, among other examples. The probability values for a known domain may be represented as a probability vector. In other words, the domain profile features for a domain may be represented as a probability vector.

The probability vector for a known domain may be continuously or periodically recalculated for the domain at sliding windows of time, such as an hourly, daily, weekly, or other interval to generate the time series of domain profile feature vectors for the domain. For example, profile feature extractor 220 may generate a time series of domain profile feature vectors Y:

$$Y=((\vec{y}_{t_0}^{d_0}, \ldots, \vec{y}_{t_c}^{d_0}), \ldots, (\vec{y}_{t_0}^{d_m}, \ldots, \vec{y}_{t_c}^{d_m})) \quad \text{[Eqn. 1]}$$

where the vector $\vec{y}$, which may be a probability vector, is a feature vector representing the domain profile features observed for a domain for given point in time (e.g., time period), $(\vec{y}_{t_0}^{d_0}, \ldots, \vec{y}_{t_c}^{d_0})$ is the profile time series of domain profile feature vectors $\vec{y}$ for domain $d_0$ from time $t_0$ to $t_c$ and $(\vec{y}_{t_0}^{d_m}, \ldots, \vec{y}_{t_c}^{d_m})$ is the time series of domain profile feature vectors $\vec{y}$ for domain $d_m$ from time $t_0$ to $t_c$.

Also as shown in FIG. 2, the domain attribute features (e.g., including the domain name itself) may be processed by attribute feature extractor 210 at the same sequential points in time by domain attribute encoder models (examples of encoder models are described further below). For example, a domain attribute feature vector may be continuously or periodically recalculated for a known domain at sliding windows of time, such as an hourly, daily, weekly, or other interval to generate the time series of domain attribute feature vectors for the domain. Thus, attribute feature extractor 210 may generate a time series of attribute feature vectors X:

$$X=((\vec{x}_{t_0}^{d_0}, \ldots, \vec{x}_{t_c}^{d_0}), \ldots, (\vec{x}_{t_0}^{d_m}, \ldots, \vec{x}_{t_c}^{d_m})) \quad [\text{Eqn. 2}]$$

where $\vec{x}$, which may be an enclosed fixed length vector in some embodiments, is a feature vector representing the domain attributes of a domain at a given point in time (e.g., time period,) $(\vec{x}_{t_0}^{d_0}, \ldots, \vec{x}_{t_c}^{d_0})$ is the attribute time series of domain attribute feature vectors $\vec{x}$ for domain $d_0$ from time $t_0$ to $t_c$ and $(\vec{x}_{t_0}^{d_m}, \ldots, \vec{x}_{t_c}^{d_m})$ is the time series of domain attribute feature vectors $\vec{x}$ for domain $d_m$ from time $t_0$ to $t_c$.

Because domain attribute features (such as domain names) tend to be variable-length text sequences, nested autoencoding learning architectures may utilized in some examples to learn an encoding model that is able to translate the variable-length sequence into a fixed-length vector. These encoding models may be used to generate a plurality of fixed-length vectors that are subsequently concatenated by attribute feature extractor 210 into a single enclosed fixed length vector that represents the combined values of the monitored domain attribute features. The vector may be recalculated for each time sample. It will be appreciated that other techniques may be used to translate a variable-length sequence into a fixed-length vector.

The probability vector and the domain attribute feature vector may be then processed through a recurrent behavior model to generate a single state vector of the combined values, that may be recurrently generated for each time sample. For example, profile prediction trainer 230 may generate time series of inferred (predicted) profile feature vectors $\hat{Y}$:

$$\hat{Y}=((\hat{\vec{y}}_{t_0}^{d_0}, \ldots, \hat{\vec{y}}_{t_c}^{d_0}), \ldots, (\hat{\vec{y}}_{t_0}^{d_m}, \ldots, \hat{\vec{y}}_{t_c}^{d_m})) \quad [\text{Eqn. 3}]$$

where the vector $\hat{\vec{y}}$ may be considered a domain profile prediction and represents predicted domain profile features for a domain for a given point of time (e.g., vector of predicted domain profile features for a time period), $(\hat{\vec{y}}_{t_0}^{d_0}, \ldots, \hat{\vec{y}}_{t_c}^{d_0})$ is the time series of inferred domain profile feature vectors $\hat{\vec{y}}$ for domain $d_0$ from time $t_0$ to $t_c$ and $(\hat{\vec{y}}_{t_0}^{d_m}, \ldots, \hat{\vec{y}}_{t_c}^{d_m})$ is the time series of domain profile feature vectors $\hat{\vec{y}}$ for domain $d_m$ from time $t_0$ to $t_c$.

The vector $\hat{\vec{y}}$ may then be processed by domain reputation assignment model 242 to generate a domain reputation score, that may indicate the relative probability that a given domain harbors malicious content. The score is updated for each time sample.

The input training data for the domain reputation assignment model 242 may be the domains' time series of inferred profile feature vectors $\hat{Y}$ as may be generated by profile prediction trainer 230, whereas the labels of the training data may be given by a time series of observed domain reputations. More particularly, domain reputations for $d_0$ to $d_m$ may be observed and stored in a reputation database 244, which may be part of domain database 204 in some embodiments. For example, domains may be assigned reputations, which may change over time. Thus, the input may include time series of observed reputations R:

$$R=((\vec{r}_{t_0}^{d_0}, \ldots, \vec{r}_{t_c}^{d_0}), \ldots, (\vec{r}_{t_0}^{d_m}, \ldots, \vec{r}_{t_c}^{d_m})) \quad [\text{Eqn. 4}]$$

where the $\vec{r}$ is an observed reputation feature vector representing the observed reputation for a domain for a given time period (e.g., time period), $(\vec{r}_{t_0}^{d_0}, \ldots, \vec{r}_{t_c}^{d_0})$ is the time series of observed reputation feature vectors $\vec{r}$ for domain $d_0$ from time $t_0$ to $t_c$ and $(\vec{r}_{t_0}^{d_m}, \ldots, \vec{r}_{t_c}^{d_m})$ is the time series of observed reputation feature vectors $\vec{r}$ for domain $d_m$ from time $t_0$ to $t_c$.

Thus, a model 242 may be built that learns to predict domain reputation feature vectors R:

$$\hat{R}=((\hat{\vec{r}}_{t_0}^{d_0}, \ldots, \hat{\vec{r}}_{t_c}^{d_0}), \ldots, (\hat{\vec{r}}_{t_0}^{d_m}, \ldots, \hat{\vec{r}}_{t_c}^{d_m})) \quad [\text{Eqn. 5}]$$

where the vector $\hat{\vec{r}}$ is a vector of predicted domain reputations for a domain for a given point in time (e.g., time period), $(\hat{\vec{r}}_{t_0}^{d_0}, \ldots, \hat{\vec{r}}_{t_c}^{d_0})$ is the predicted domain reputation time series of predicted domain reputation feature vectors for domain $d_0$ from time $t_0$ to $t_c$, and $(\hat{\vec{r}}_{t_0}^{d_m}, \ldots, \hat{\vec{r}}_{t_c}^{d_m})$ is the predicted domain reputation time series of predicted domain reputation feature vectors for domain $d_m$ from time $t_0$ to $t_c$. The domain reputation assignment model 242 may be configured to output a predicted domain reputation as a reputation score.

As will be appreciated then, a domain reputation prediction model can be trained. In some embodiments, the domain reputation prediction model may comprise multiple trained machine learning models. For example, a domain reputation prediction model may include, a domain attribute feature extractor model 212, a domain profile feature extractor model 222, a domain profile prediction model 232 and a domain reputation assignment model 242. In some embodiments, each of the domain attribute feature extractor model 212, domain profile feature extractor model 222, domain profile prediction model 232 and domain reputation assignment model 242 may be implemented as a neural network and the domain reputation prediction model may be considered a single neural network.

Figure 3:
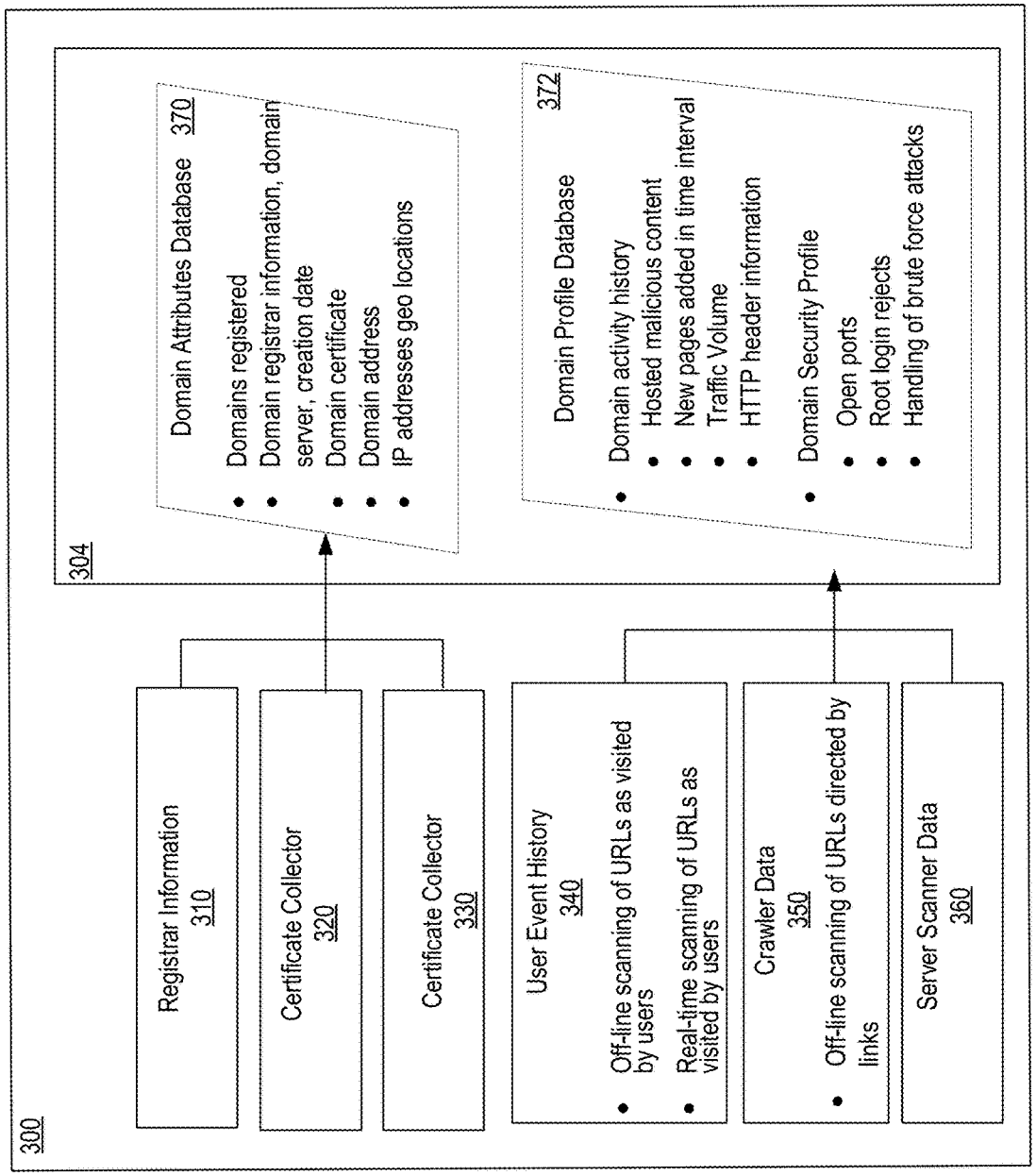
FIG. 3 is a diagrammatic representation of data collection that may be performed to generate a domain database according to one embodiment.

FIG. 3 is a diagrammatic representation of one embodiment of domain processing engine 300, which may be an example of domain processing engine 200, collecting domain attribute data and domain profile data to populate domain database 304. As shown in FIG. 3, domain processing engine may include code executable to collect domain attribute features. Examples of domain attribute features may include but are not limited to registrar information 310, certificate information 320, and IP address information 330. Domain attribute features may be derived from sources of information that are publicly available from services such as WHOIS and DNS or from the public interface of the HTTPS based web server that is hosted on the domain of interest. The domain attribute information may be updated periodically. A domain attribute database 370 may thus store domain attribute data such as domain names registered, domain registrar information (such as domain name server and creation date), information from the domain certificate (including the identity of the issuer, subject matter information, issuance dates, and alternate names), domain IP addresses and associated geographic location, to produce domain attribute data for times $t_0$ to $t_c$. It will be appreciated that any combination of domain attributes may be used in addition to or as an alternative to the discussed attributes. In examples, at least the domain name itself is used. For example, a domain that hosts web content may not support the HTTPS protocol in favor of using the insecure HTTP protocol that does not require availability of certificate information. In that instance, the domain name itself may be included in the collected attribute data, such that it may be used to look up or resolve metadata associated with the domain. In examples, the domain name and associated records are generally represented as unstructured text and may therefore require some processing to extract domain attribute feature vectors for use with machine learning.

In addition to the example domain attribute features described above, embodiments may also use domain profile features. In some embodiments, such features may be collected from one or both of (i) passively observed historical user event features (including, by way of example and not limitation, historical event logs of web requests and detected threats associated with real-time scanning of requested content or URLs from a large user base), or (ii) actively probed event features, discerned through preemptive scanning and crawling of the services to identify data that are exposed to the public internet but may be absent from historical event logs. These profile features track the observed security-related characteristics or risk factors that may serve as both input and predicted target values for a recurrent neural network. The profile features may incorporate threat intelligence compiled from various content-based threat detectors as well as the general popularity and security posture observed for the domain on a given window of time.

User event features associated with a domain may include but are not limited to one or more of the following: request volume, number of unique URLs, number of malware threats detected (PE, scripts, APK, etc.), number of phishing threats detected, number of new threats discovered, frequency of malicious activity (total count malicious activity/total number requests), percent of malicious pages (malicious URL count/total URL count).

Probed event features associated with a domain may include but are not limited to one or more of the following: number and classifications (including results of active scanning) of unique pages discovered through crawling recursively followed links found in hypertext content, open network ports and services, identification of HTTP server process and version and other HTTP header information, volatility of hosted content (e.g. number of newly created pages, modified pages, or removed pages, and network communication latency.

In the illustrated embodiment of FIG. 3, domain profile features include one or more of: user event history information 340 (which may result from one or both of offline scanning and real-time scanning of URLs as visited by users), crawler information 350 from offline scanning of URLs directed by links, and server scanner information 360, which is generated from server scanning. Accordingly, the domain profile database 372 may comprise one or more of domain activity history (including but not limited to one or more of hosted malicious content, new pages added in a given time interval, traffic volume, and http header information, for example) and domain security profile information (including but not limited to one or more of open ports, root login rejects, and handling of brute-force attacks, for example). A profile feature extractor, e.g., profile feature extractor may extract the domain profile features associated with a domain in a time period as probability vector for the time period.

Figure 4:
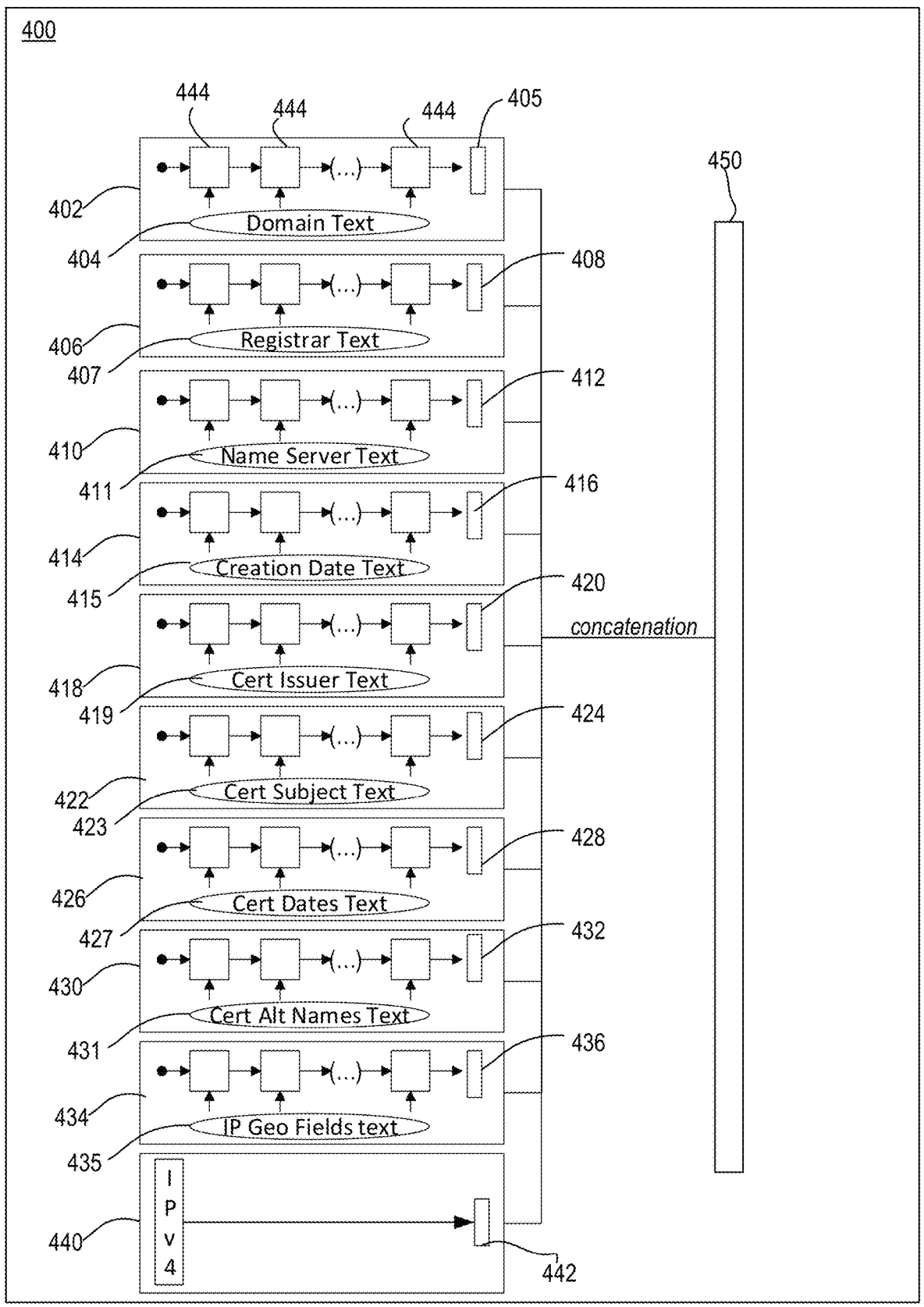
FIG. 4 is a diagrammatic representation of one embodiment of a domain attribute feature extractor.

FIG. 4 illustrates an embodiment of a domain attribute feature extractor 400, which may be one embodiment of domain attribute feature extractor 400. In some embodiments, domain attribute feature extractor 400 performs a method of encoding the information present in domain attribute sources (which, in some examples, are text strings) into a concatenated feature vector 450 for a time period (e.g., a feature vector that may be used by a profile prediction trainer (e.g., profile prediction trainer 230) and a domain reputation assignment (e.g., domain reputation assignment model 242) to predict malicious activity that may occur on the domain. Domain attribute feature extractor 400 uses machine learning encoders to encode domain attribute data that is represented as variable length text as a fixed length feature vector. According to one embodiment, this encoding process may be performed independently on each text attribute using a recurrent neural network architecture on the sequence of characters to produce a fixed-length output vector. For example, domain attribute feature extractor 400 implements autoencoder 402 to encode the domain text (e.g., domain name) 404 as fixed length feature vector 405, autoencoder 406 to encode domain registrar text 407 as fixed length feature vector 408, autoencoder 410 to encode name server text (e.g., domain name server) 411 as fixed length feature vector 412, autoencoder 414 to encode creation date text 415 as fixed length feature vector 416, autoencoder 418 to encode domain certificate dates text 419 as fixed length feature vector 420, autoencoder 422 to encode domain certificate subject text 423 as fixed length feature vector 424, autoencoder 426 to encode domain certificate issuer text 427 as fixed length feature vector 428, autoencoder 430 to encode domain certificate alternate names text 431 as fixed length feature vector 432, and autoencoder 434 to encode IP address geographic fields text 435 as fixed length feature vector 436.

It can be noted that some domain attributes are represented numerically. An attribute that is already represented numerically (e.g., the 32-bit IPv4 address) may be encoded through either a fully-connected autoencoder, a restricted Boltzmann machine, or other encoding to produce a compressed fixed-length output vector (e.g., fixed length feature vector 442). As will be described in more detail below, a "fully-connected autoencoder" 440 may be used to encode one fixed length representation into a smaller representation.

As discussed above, encoding on each text attribute using a recurrent neural network architecture on the sequence of characters to produce a single fixed-length output vector. Using the example of autoencoder 402, a domain name can be encoded as a single fixed length output vector 405. As will be appreciated, a domain name is a human-readable label that identifies a computer or group of computers on a network such as the internet. A domain name is typically registered with a DNS authority. In some examples, a domain name contains features that indicate that a computer identified by the domain name is suspicious or likely to host malicious content. For example, certain top-level domains tend to be frequently used to host malicious content, while other domain names may contain deceptive patterns commonly used to trick a user into mistaking it for a legitimate domain.

The sequence of characters that comprise the domain name may be encoded as a fixed-length vector of real-numbered values through use of an encoding model (e.g., as may be used by domain attribute feature extractor 400). The encoding model may be learned through use of a "sequence autoencoder" architecture that combines an encoder RNN component with a decoder RNN component to regenerate the original sequence from a single fixed-length vector referred to as the "code." An example encoder-decoder architecture uses an LSTM that takes as input an arbitrary sequence of characters, and then maps it to another sequence of characters through a fixed-length bottleneck (i.e., the "code"). In one embodiment, an approach to learning the encoding for domain names and other text attributes is by using such LSTM modelling in an autoregressive neural network architecture, where the target sequence is identical to the input sequence. This approach may provide an efficient method of transforming sequential inputs of arbitrary length into fixed-length feature vectors that may then be used as a latent representation to be consumed by a domain prediction model, such as a domain profile prediction model or a domain reputation assignment model.

This sequence autoencoder approach may be further extended in a nested architecture. In examples where the sequence autoencoder architecture as described above may be inefficient for learning very long sequences of characters, it may be desirable to reduce the distance of input tokens from the loss signal by making use of higher order tokenization units within the text sequence (such as words or phrases). While such approaches may reduce the length of sequences, they may require a fixed vocabulary of words, and may not be as well suited for applications such as the encoding of domain names, where each newly registered domain is likely to contain a novel word composed of a unique sequence of characters. To address this problem, multiple autoencoders may be used, wherein the autoencoders may be arranged in a nested architecture. In this architecture, the text sequence may be tokenized into a relatively small, but variable number of component words. The encoded output of a first autoencoder learning architecture may be provided as a sequential input to a second sequence autoencoder, to form a hierarchical nested encoder architecture designed to address the challenges of modelling very long sequences found in text, which also benefits from the intuitive abstraction of word-level features without the requirement of a fixed vocabulary. It will be appreciated that, in other examples, this nested architecture may be replaced by a different architecture, where the domain may be encoded as a single sequence using an RNN or CNN.

In the example of FIG. 4, encoders 402-434 depict the application of nested autoencoder learning algorithms to example variable length domain attribute features to generate single encoded fixed length representation of the domain attributes of a given domain (e.g., domain text, registrar text, name server text, etc.). Each autoencoder may implement the recurrent architecture of the encoder model, represented for encoder 402 as encoder frames 444 (e.g., a recurrent architecture of word encoders, phrase encoders or other models) to implement a sequence of nested autoencoders. An autoencoder may have any number of layers and different encoders may use different numbers of layers. One example of an autoencoder 402 is discussed further in conjunction with FIG. 5A, FIGS. 5B and 5C. Note that the decoder component of the autoencoder architecture described below with reference to FIG. 5B and FIG. 5C is provided for completeness but may be omitted in the encoding process.

Continuing with FIG. 4, each domain attribute feature is processed through a separate encoder, with the final output of each respective encoder model being used as the fixed-length encoding for that domain attribute feature (e.g., as illustrated by fixed-length feature vectors 405, 408, 412, 416, 420, 424, 428, 432, 436). These initial representations are concatenated into a single vectored representation (e.g., as illustrated by concatenated feature vector 450, which may be an example of a domain attribute feature vector Note that not all of the domain attribute features depicted in FIG. 4 are required in order to provide an encoded fixed length representation of the domain attributes of a given domain for further processing by a domain prediction model, such as domain profile prediction model 232 or a domain reputation assignment model 242. Rather, it will be appreciated that fewer domain attribute features, alternate domain attribute features, or additional domain attribute features may be used. Also note that, as depicted by autoencoder 440 of FIG. 4, the results of the nested autoencoders 402-434 may be combined with one or more fixed length domain attribute features of the domain, such as the IP address of the domain, to generate a single fixed length characterization of the selected domain attributes.

Figure 5A:
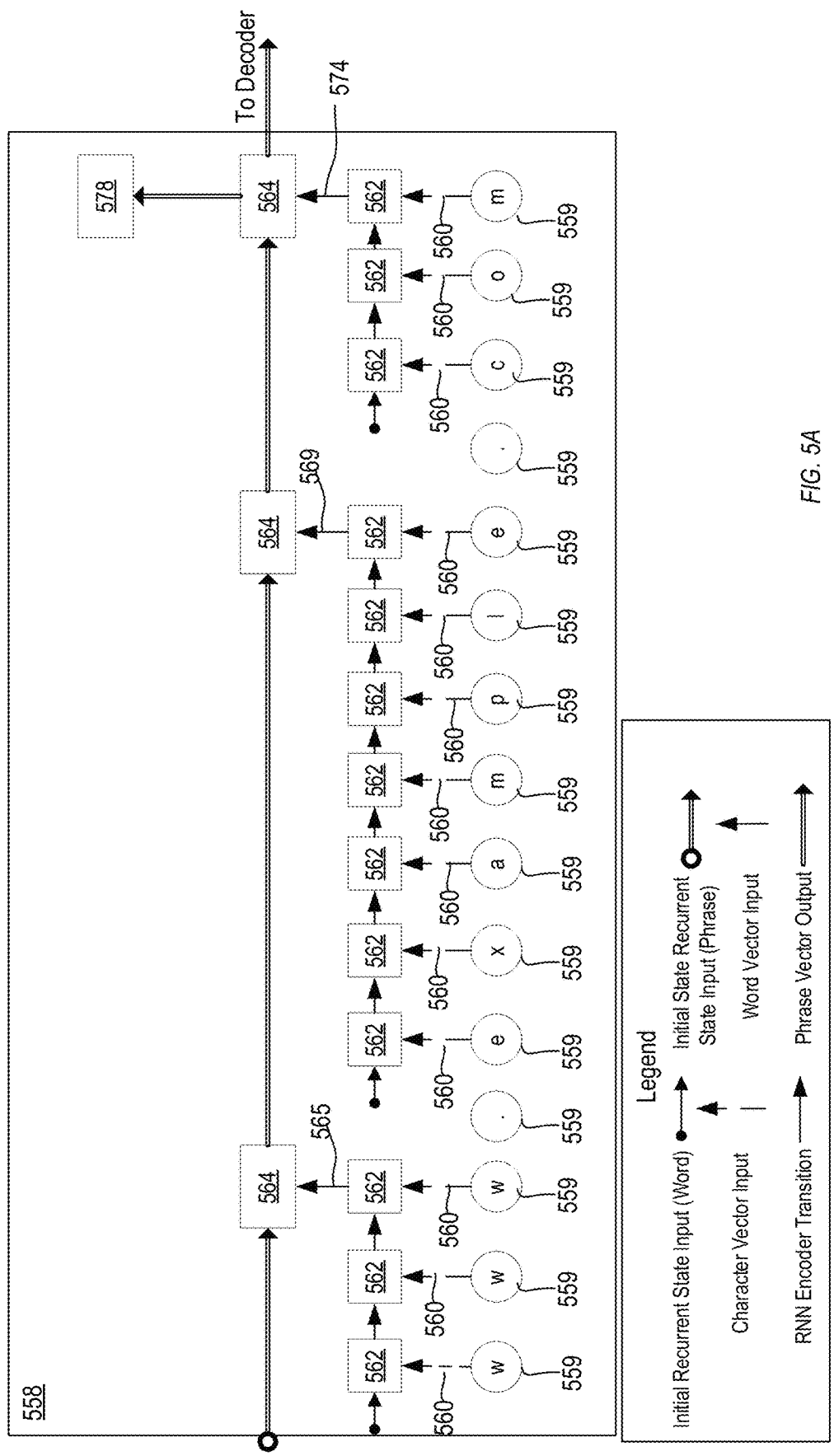
FIG. 5A is diagrammatic representation of an example recurrent neural network architecture utilized by an attribute feature extractor to encode variable-length input data into fixed-length vectors.
Figure 5B:
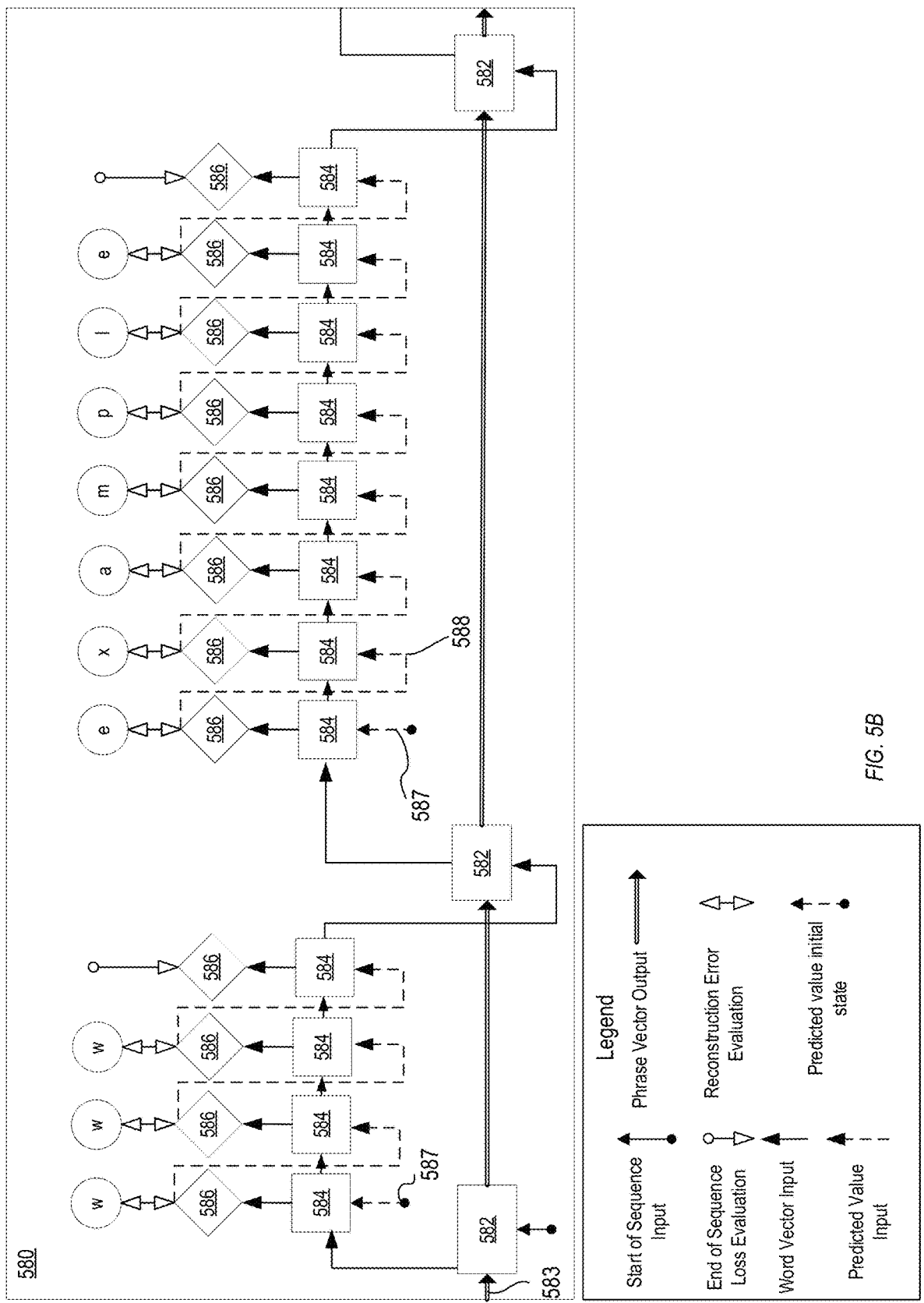
FIG. 5B and FIG. 5C are diagrammatic representations illustrating one embodiment of a decoder component of recurrent neural network.
Figure 5C:
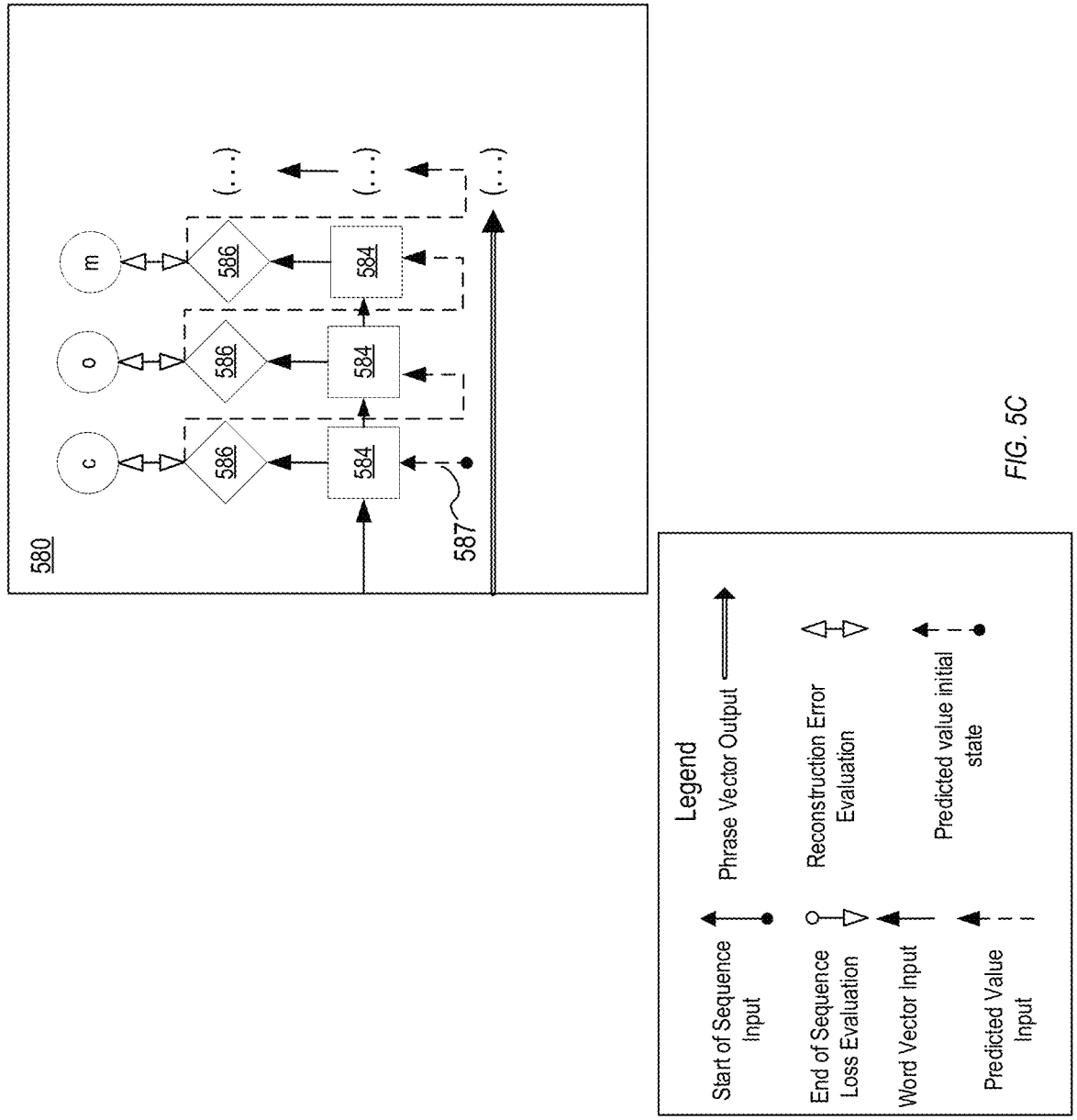

FIG. 5A, FIG. 5B and FIG. 5C illustrate an example recurrent neural network architecture that may be utilized in the attribute feature extractor to encode variable-length input data into fixed-length vectors. In the embodiment of FIG. 5A, FIG. 5B and FIG. 5C, the RNN architecture includes an encoder component 558 and decoder component 580. Encoder component 558 may be used to generate a fixed length domain attribute encoding. For example, encoder component 558 may be used to generate a fixed length domain attribute encoding 578 for the domain text and thus may represent an embodiment of autoencoder 402. FIG. 5A, FIG. 5B and FIG. 5C depict the use of four RNN models: a word encoder model and a phrase encoder model (that are part of the encoder component 558), and a phrase decoder model and a word decoder model (that are part of the decoder component 580). As will be appreciated, the recurrent nature of the RNN is unrolled across time steps. As such, FIG. 5A illustrates word-level RNN frames 562, which represent an instance of the word encoder model at multiple points in time, and phrase-level RNN frames 562, which represent an instance of the phase encoder model at multiple points in time. Similarly, FIG. 5B and FIG. 5C illustrate phrase-level RNN frames 582, which represent an instance of a phrase decoder model at multiple points in time, and word-level RNN frames 584, which represent an instance of a word decoder model at multiple points in time. In various embodiments, the encoder component 558 transforms input into a simpler representation, while the decoder component 580 reconstructs the original output. Encoder learning may be achieved through reconstruction error from the decoder through the bottleneck of the code (i.e., the fixed length feature vector).

In the depicted example, a domain name www.example.com may be separated into three word units "www", "example", and "com" delimited by the "." character. Each of the word units may then be evaluated as a sequence of characters. In the illustrated embodiment, the sequence of characters of each word unit is tokenized (e.g., as a character token 559, illustrated as the bottom layer of encoder component 558) as defined by the fixed set of characters allowed by the domain name specification. The character sequences are used input to the word encoder model to produce a sequence of three word code vectors. For each word unit, each character in the sequence is provided as a character vector input 560 to the word encoder model (e.g., at a respective word-level RNN frame 562). According to one embodiment, the word encoder model takes a fixed length vector of zeroed values as the initial recurrent state input. At the last time step for a word unit, the word encoder model provides a word vector for input to the phrase encoder model (depicted as the upper layer of encoder component 558). According to one embodiment, the phrase encoder model takes a fixed-length vector of zeroed values as the initial recurrent state input.

Thus, each word unit may correspond to a its own respective word vector representation and phrase-level RNN frame 564, but share a phrase encoder model. For example, character vector inputs 560 for "www" are input to the word encoder model to produce word vector 565, which is input to the phrase encoder model at a respective phrase-level RNN frame 564. Character vector inputs 560 for "example" are input to the word encoder model to produce word code vector 569, which is input to the phrase encoder model at the respective phrase level RNN frame 564. Finally, character vector inputs 560 for "com" are provided to the word encoder model to produce word code vector 574, which is input to the phrase encoder model at the respective phrase-level RNN frame. Thus, in some embodiments, the sequence of word vector representations may be used as the input to a single phrase encoder model that produces a final code vector 578, which incorporates all of word vectors from the entire sequence implemented by encoder component 558.

Turning now to the decoder component 580, which begins on FIG. 5B and continues to FIG. 5C, phrase-level RNN frames 582 represent a phrase decoder model (illustrated as the bottom layer of the decoder component 580) at different points in time. Word-level RNN frames 584 represent a word decoder model (depicted as the middle layer of the decoder component 580) at different points in time. The phrase decoder model may take a final code vector 583 (e.g., as may be generated by the encoder component discussed above) as the initial state of the RNN. Accordingly, the phrase decoder model uses the final code vector 583 to generate a sequence of fixed length word encodings. Each of these generated word encodings may be used as the initial state of the word decoder model to produce a sequence of characters, with the target of regenerating the original domain sequence (shown as the upper layer of the decoder component 580) from only the data contained from the code (i.e., the fixed length feature vector).

As will be appreciated, the word decoder model produces multiple outputs, for example one per time step (one per word-level RNN frame 584). The word decoder model outputs may be provided to a categorical layer 586, such as a component that applies a softmax function to the vector to predict the character. Each time step in the word decoder model takes as input the predicted value from the output of the previous time step, starting with a vector of zeroed values 587 for the first state, which has no previous prediction value available. One example the predicted value from the output of the previous time step is illustrated by line 588 in FIG. 5B. Generation of predicted characters may continue until the end of the text is reached.

The autoencoder network depicted in FIG. 5A, FIG. 5B and FIG. 5C may be trained by comparing the predicted probability of each character at each time step with the target character from the original sequence. For example, a binary classification loss function may be used. It will be appreciated that a variety of other loss function algorithms may be used, such as hinge loss or cross entropy loss. For example, using cross entropy loss, cross entropy losses may be backpropagated through the entire autoencoder network to calculate the gradients with respect to the weights in both the decoder component and the encoder component.

Once the RNN is well trained (e.g., exhibiting a calculated loss is below a threshold, an accuracy percentage is above a threshold, etc.), encoder component 558 may be used for further encoding. According to some embodiments, only the encoder component 558 is used when converting the text sequence into a fixed-length vector. That is, decoder component 580 is not used once encoder component 558 is considered trained.

Returning to FIG. 4, other autoencoders may similarly be implemented by RNN architectures. Because a domain name may be registered in a domain name registry by a domain name registrar, the domain name is associated with other information about the registrant and registrar that may be looked up in a directory. Although the registrant information may be unreliable or unavailable due to privacy policies or the use of fake registration information, among other examples, the registrar is required to provide a registrar URL. Thus, domain registrar text 407 may include information about the registrar such as the registrar URL. Accordingly, the registrar URL may be used to identify the registrar as either a trustworthy registrar or one that is frequently abused to register malicious domains. This registrar URL, either alone or in combination with one or more name servers in the DNS record (and included in name server text 411), may be processed as domain attribute features using the example nested autoencoder learning architecture (e.g., autoencoder 406 and autoencoder 410 in FIG. 4, respectively) as described above for encoding the character sequence content of domain names.

In addition, the creation date and modification date, which may be included as part of creation date text 415) are also text fields that may be used to provide information that will contribute to the reputation score. Because DNS registration records do not require any strict date formats, the text fields containing the relevant dates may be processed using a syntactic parser to convert variable length date information into fixed-length expressions. As another example, a text encoding approach similar to the method described above for encoding domain names may be used.

Although there are various well defined algorithms for converting a text representation of a date into a single numeric representation (e.g., number of seconds elapsed since epoch), the use of such algorithms may fail if the text representation does not meet the strict syntax requirements of the algorithm, leading to undefined or no input for the date field. This type of processing may also remove information on how the date was represented by the registrant and/or registrar, which may be relevant to determining the reputation of a domain. For example, the creation date field of a DNS registration record may contain a typo caused by erroneous input from the registrant or misprocessing by the registrar. In another example, the creation date may be represented in a non-English language or using a non-standard encoding. Because these types of differences can contribute to the overall reputation evaluated for the domain, an autoencoder 414 utilizing a nested autoencoding learning architecture may be used for generating fixed-length representations of such date fields.

Although a domain name is not necessarily directly associated with an IP address, it must ultimately resolve to one or more IP addresses. For example, the domain name may be associated with a name server, such that a DNS lookup may be used to determine an ultimate IP address to use for internet communication. Similar to domain names, IP addresses may serve as relevant sources of data to determine the reputation of a host on the internet. In an example, a fully connected autoencoder architecture is utilized, as will now be described in more detail with reference to the example of encoding/decoding an IPv4 address. An IPv4 address is composed of 32 bits of data grouped in 4 octet groups, which may be condensed into an abstract feature representation using the fully connected autoencoder architecture. The encoder portion is a fully connected layer that transforms a fixed length input (here, 32 bits) into a latent encoded representation of 16 or fewer real valued numbers. The decoder portion is also a fully connected layer that takes the encoded vector as input and reconstructs original 32 bits of the IP address. It will be appreciated that while examples herein are discussed with respect to IPv4, other addresses (e.g., IPv6) may be processed using similar techniques.

An IP address may also be evaluated to determine associated meta information. For example, information about ownership, issuer, and geographical information of the physical network infrastructure may be determined for an IP address. This meta information is represented as unstructured text (e.g., as part of IP geo fields text 435) and may also be processed using the nested autoencoding learning architecture described above (e.g. using autoencoder 434 or another encoder). Some domains are also associated with an IPv6 address, which may serve as a relevant indicator of the reputation of the domain and may be encoded using the fully connected autoencoder architecture described above.

Web traffic encrypted via HTTPS requires a certificate to validate the identity of the web server. While not all web domains have associated certificates, they may contain information that may optionally be used to increase or decrease the inferred reputation of a domain. An HTTPS certificate contains a number of useful text fields that may be relevant for the subject application, including, but not limited to certificate issuer name, subject name, subject alternative names, and key usage. It also contains date information regarding the validity period of the certificate. These certificate fields may be processed in the same manner as DNS registration records as described above (e.g., using autoencoders 418, 422, 426, 430). It will be appreciated that fewer, additional, or alternative fields may be used in other examples.

Turning now to domain profile features (or event features), these features may be represented as numbers and may be further processed by a profile feature extractor (e.g., profile feature extractor 220 of FIG. 2) into a vector comprising of a set of probability values representing the expectation of a certain malicious or security-related event being observed on the given domain. Thus, as an example, the feature extraction process for domain profile features may comprise collecting the count of given events within a time window (e.g. an hour, a day, etc.), and converting it into a real numbered probability value from 0 to 1, representing the relative frequency of occurrence. As discussed above with respect to the domain attribute features, the domain profile features may be concatenated into a single combined feature vector to be used in a domain prediction model, such as a domain profile prediction model 232 or a domain reputation assignment model 242.

In examples where the domain profile features are expressed as probabilities, statistics may be collected for a given time window and therefore may not necessarily be observed in real-time. However, the domain profile features from the most recently evaluated time window (time $t_{c-1}$) may be used both as a strong predictive input for a recurrent neural network in predicting the respective values of the domain profile features for the current time window (time $t_c$), and additionally as a target to compute the error when compared to the predicted output of the last time window.

Figure 6:
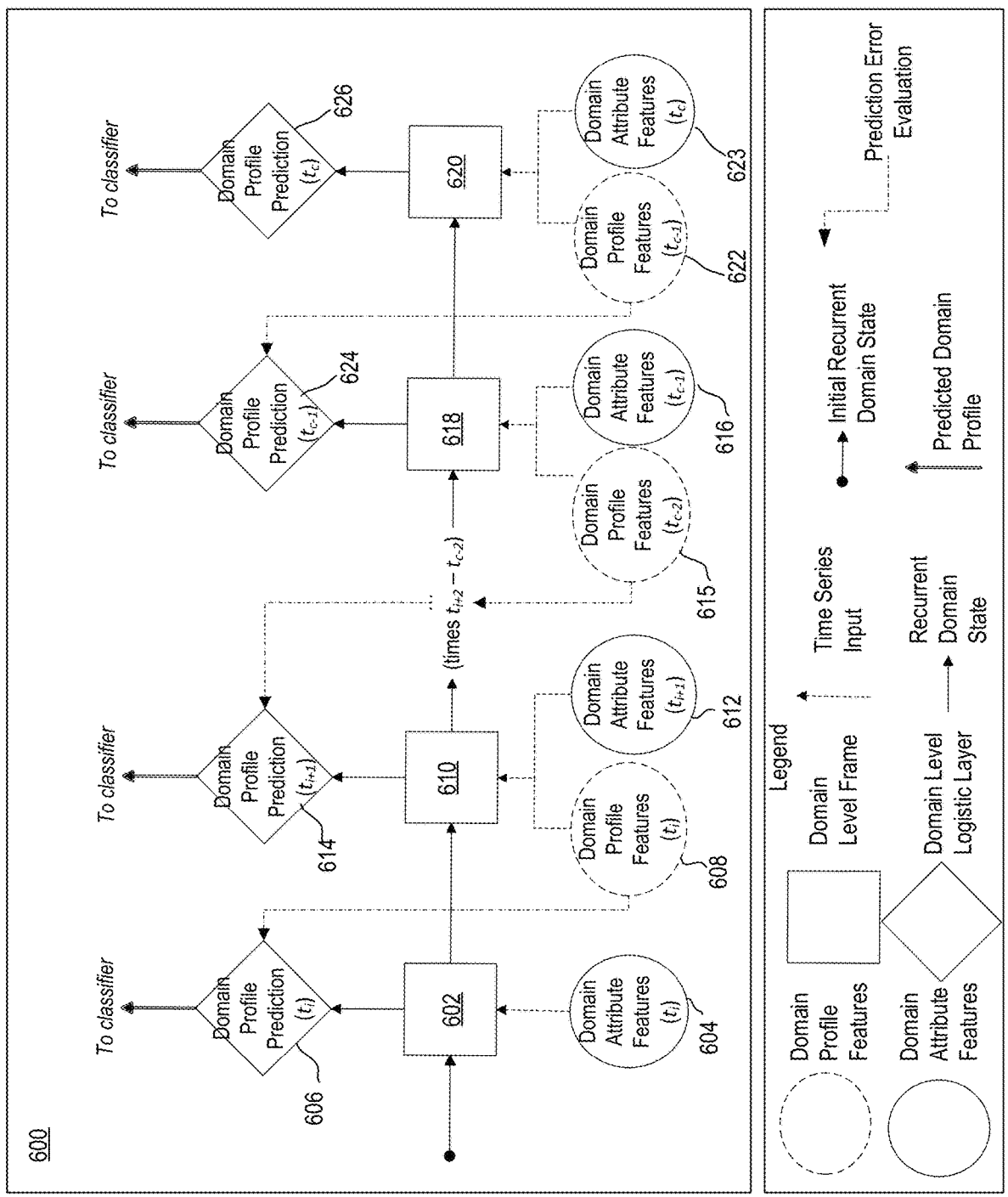
FIG. 6 is diagrammatic representation of one embodiment of a recurrent neural network, illustrating one embodiment of how domain attribute features and domain profile features are combined at various windows in time to generate a domain profile prediction based off of the most recent observations and the previous profile history.

FIG. 6 is diagrammatic representation of one embodiment of a recurrent neural network 600, illustrating one embodiment of how domain attribute features and domain profile features are combined at various windows in time to generate a domain profile prediction. Such aspects may be used by profile prediction trainer 230 of FIG. 2. When RNN achieves specified criteria (e.g., exhibiting a calculated loss is below a threshold, an accuracy percentage is above a threshold, etc.), RNN 600 may be considered to be a trained domain profile prediction model usable to predict domain reputations based on real-time sampling. Thus, for example, trained RNN 600 may be utilized, for example, as a profile prediction model 232.

The RNN architecture of FIG. 6 includes a sequence of domain level RNN frames 602, 610, 618, 620 corresponding to time $t_i$ to time $t_c$ and a domain level logistic (as illustrated by logistic layer components 606, 614, 624, 626). As illustrated, at each domain level frame, the domain profile prediction model takes the current observation of the respective domain attribute features (e.g., domain attribute features 604, 612, 616, 623) and domain profile features (e.g., domain profile features 608, 615, 622) as input.

The domain level RNN frames represent a domain profile prediction model at multiple time steps and the logistic layer component represent the processing of the logistic layer at the time steps. In general, at each time step RNN 600 may use as complete as possible history for domains, from the beginning of the recorded history to the most current observation. For example, RNN 600 may use the timeseries of available domain feature observation (domain attribute features and domain profile features) for each time step from $t_0$ to $t_c$. Even more particularly, at each time step RNN 600 may use the current observation of domain features at the current time step—that is, the current observation of domain attribute features and the current observation of current domain profile features—and the prior history of domain feature observations, where the prior history is recursively defined as the current observation of domain features at the previous time step and the prior history at the previous time step. It may be recalled that, in some embodiments, the domain profile features are calculated from domain profile data collected in a time period. Thus, as illustrated in FIG. 6, the current observation of domain features for $t_c$ may be composed of the domain attribute features 623 from a current time window $t_c$ (e.g., the domain attribute features $\vec{x}_{t_c}$ for each domain) and the domain profile attributes 622 determined from domain profile data observed and collected over the previous time window (e.g., $\vec{y}_{t_{c-1}}$ for each domain).

Note that, in some examples, before the initial observation of profile events on a given domain j at time $t_i$, the predicted domain profile (e.g., $\hat{\vec{y}}_{t_i}^{d_j}$) may be a result of only the domain attribute feature input for $d_j$. On subsequent time steps, however, the domain profile prediction may be based on the recurrent domain state from the previous evaluation for the domain, and the current domain feature observation, for example the current domain attribute features, and the domain profile features that were observed and collected over the previous time window.

For example, at $t_0$, profile attributes for a domain $d_j$ may not yet be determined (e.g., $\vec{y}_{t_0}^{d_j}$ may be empty). Thus, at $t_0$ a domain level RNN frame 602 may make a determination of domain state based on the domain attribute features 604 for $t_0$. For example, profile prediction trainer 230 may predict $\hat{\vec{y}}_{t_0}^{d_j}$ based on $\vec{x}_{t_0}^j$. At time $t_1$, the predicted domain profile can be compared to the observed domain profile features 608 for $t_0$. For example, $\hat{\vec{y}}_{t_0}^{d_j}$ predicted for $t_0$ and $\vec{y}_{t_0}^{d_j}$ observed for $t_0$ (e.g., and collected at $t_1$) can be compared to determine error. Similarly, at domain level RNN frame 610, a prediction for example, $\hat{\vec{y}}_{t_{i+1}}^{d_j}$ can be made using for example $\vec{x}_{t_{i+1}}^{d_j}$ and $\vec{y}_{t_i}^{d_j}$ and at $t_{i+2}$ the prediction $\hat{\vec{y}}_{t_{i+1}}^{d_j}$ can be compared to $\vec{y}_{t_{i+1}}^{d_j}$ to determine loss.

According to one embodiment, the error of each output may be calculated by a loss function such as cross entropy loss or mean squared error between the observed domain profile vector for the time and the predicted domain profile vector, for example:

$$\text{CrossEntropyLoss} = (\hat{\vec{y}} \log(\vec{y}) + (1-\hat{\vec{y}})\log(1-\vec{y})) \quad \text{[Eqn. 6]}$$

where the vector $\hat{\vec{y}}$ represents a predicted domain profile—that is predicted domain profile features—for a given point in time and the vector $\vec{y}$ represents the observed profile features for the given point in time.

It will be appreciated that the above equation is provided as an example and that other loss functions may be used. In examples, the error may be used as an input for calculating the gradient used to optimize the parameters of the neural network layers within the recurrent neural network and beyond to the encoder layers through a backpropagation algorithm. For example, the partial derivative of the error with respect to each weight in the neural network is calculated through successive application of the chain rule and then applied to a numerical optimization algorithm in a way such that the error is minimized.

As depicted in FIG. 6, domain profile features (e.g., one or both of user event features and probed event features) may be continuously or periodically collected at multiple sliding windows in time $t_i \ldots t_{c-1}, t_c$ along with domain attribute features as described above, to serve as input to a recurrent neural network. For example, domain profile features 608 and domain attribute features 612 are used as input at domain level RNN frame 610, domain profile features 615 and domain attribute features 616 are used as input at domain level RNN frame 618 and domain profile features 622 and domain attribute features 623 are used as input at domain level RNN frame 620. Accordingly, an updated recurrent domain state is produced for time $t_i, t_{c-1}, t_c$, which is sequentially updated and fed into a domain-level logistic layer (as illustrated by logistic layer components 606, 614 . . . 626). The logistic layer produces predicted domain risk probabilities (e.g., inferred profile feature vectors $\hat{Y}$) that are used by the reputation assignment model (e.g., domain reputation assignment model 242 of FIG. 2) to determine the overall domain reputation score. According to one embodiment, and as discussed above, predicted output risk probabilities for a current time step may be compared against observed domain profile features from the next time step to calculate a loss, which is backpropagated throughout the entire network and used to optimize the RNN's parameters according to the objective function. For example, logistic layer components 606, 614, 624, 626 may determine the cross-entropy loss according to Eqn. 6 above or otherwise determine the error.

Because the encoder models used for encoding the static domain attribute features may be constructed as a neural network, their parameters may either remain fixed as independent networks or they may be fine-tuned as the loss is backpropagated to the raw input. Although each encoded feature may be thought of as the output of a modular network, the composition within the recurrent network 600 representing the time series may be thought of as a single fully differentiable deep neural network. For example, the backpropagation algorithm defines a way to calculate the partial derivative of the error with respect to each of the weights in the recurrent neural network 600, but can also be further used to determine the error with respect to each of the domain attribute features used as input. This error may then be used as the output error for the encoder layer and the backpropagation algorithm is then further used to calculate the error with respect to each of the parameters in the encoder models.

As illustrated by the example in FIG. 6, the recurrent neural network architecture described above may be used to predict likelihood of various types of risk factors being encountered on a domain—that is to determine an inferred profile feature vector for the domain—given three inputs: domain attribute features, the domain profile features, and the previous state of the model. As discussed above, at the first time step (time 0), there may not be domain profile data (historical observations) for that domain or a previous state may not be available for that domain, so the inferred profile feature vector provided to the domain reputation assignment model for a time step may be based off the domain attribute features for the domain without considering domain profile features. As such, the domain reputation score can be generated by the domain reputation assignment model without requiring domain profile attributes be collected or determined for that domain. The capability to determine a domain reputation score with little or no domain profile feature data for the domain can provide an advantage, as many domains used for malicious activity are used for a very short period of time before being discarded in favor of a new domain with no history (and therefore no observed domain reputation) as a way of avoiding detection. In some embodiments, this absence of history may be considered in of itself a risk factor.

Figure 7:
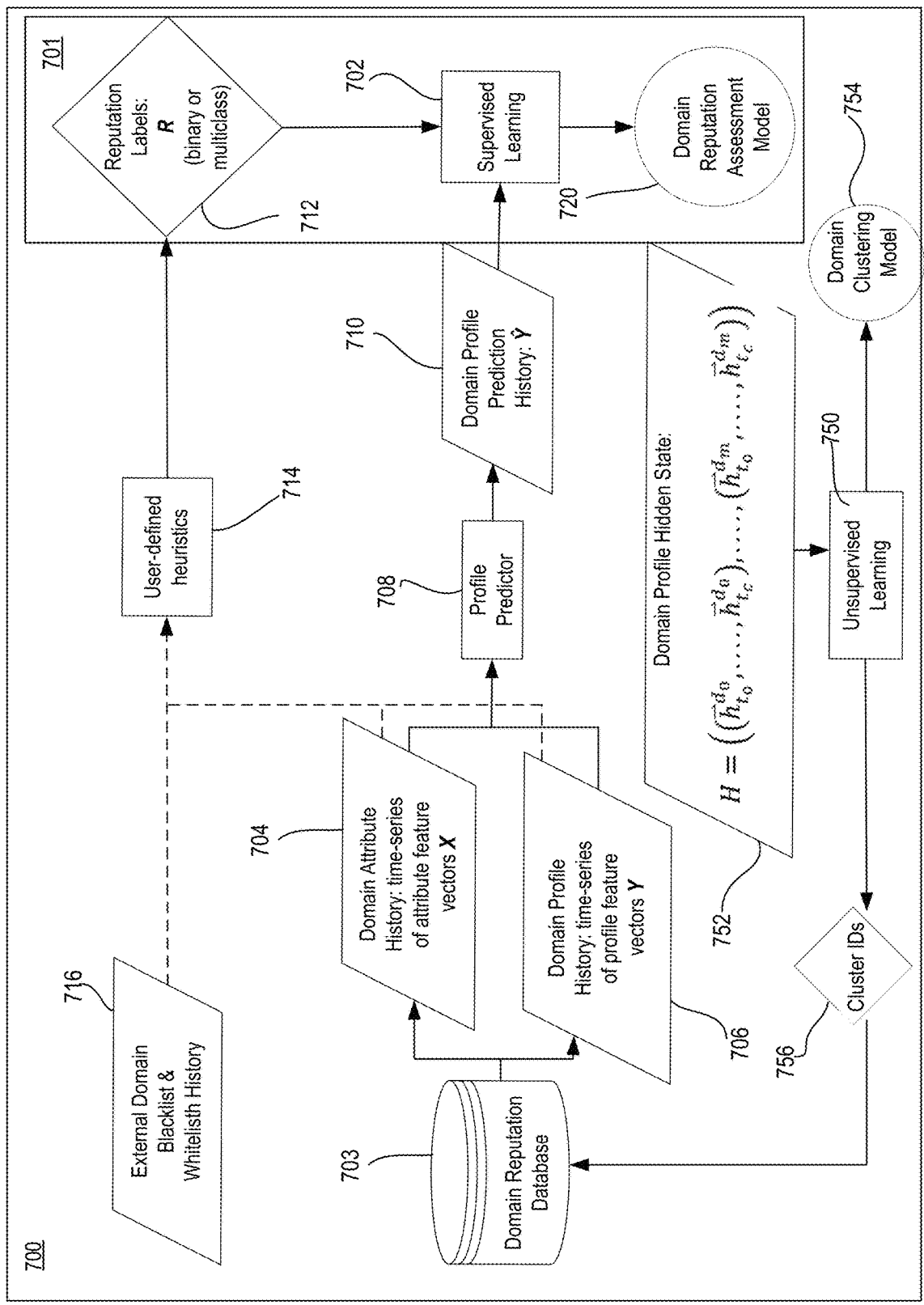
FIG. 7 is a diagrammatic representation of an example domain reputation assignment process.

Because the domain profile prediction is a vector of probabilities, it may be difficult to use such a vector in an automated system (e.g., using the decision to block or allow web traffic, etc.). To address this problem, the domain profile features may be used as an input to a domain reputation assignment model (e.g., domain reputation assignment model 242 of FIG. 2), as described in more detail below. Turning to FIG. 7, one embodiment of a reputation trainer 700, which may be an example of reputation trainer 240, is illustrated. Reputation trainer 722 includes a classifier module 701 that includes a domain reputation assignment model 720 trained through a supervised learning process 702.

Domain reputation assessment module may be trained based, for example, on domain attribute features and domain profile features. For example, for a set of domains $d_0 \ldots d_m$, domain attribute data and domain profile data may be extracted from domain reputation database 703 as a time series 704 of domain attribute feature vectors X and time series 706 of domain profile feature vectors Y (e.g., probability vectors), which may be input to a profile predictor 708 to produce a time series 710 of predicted domain profiles $\hat{Y}$. Profile predictor 708 may be implemented as a trained RNN as discussed above, for example, with respect to FIG. 6.

A profile prediction $\hat{Y}$ for a domain may be mapped to a corresponding reputation label 712 (e.g., labelled with a corresponding reputation as a training label), which may be determined through evaluation of user-defined heuristics 714 on the data present in the attribute history and profile history observed for the domain. In some examples, other threat intelligence data may be used, such as data from external domain blacklist and whitelist sources 716. Reputation labels 712 may be defined as binary values of 0 or 1, or alternatively as categorical representation of one of multiple classes, as desired to meet the requirements of a security application. In some embodiments then, supervised machine learning process 702 uses a time series 710 of predicted domain profiles $\hat{Y}$ and a time series of assigned reputation labels 712, R, to train reputation assignment model 720.

Reputation assignment model 720 may be implemented as a neural network (e.g., a single or multilayer neural network). For example, the input layer may use the predicted domain profile features at each time window and transform it to some number of hidden representations through linear transformation, implemented as matrix multiplication of the input vector against the weights matrix, followed by a nonlinear activation. After one or more hidden layers, there is an output layer in which the hidden representation output of the previous layer is taken as input for a linear transformation into the desired number of outputs followed by, for example, a softmax activation. Thus, for each time step and domain, the neural network may determine a predicted reputation for a domain $\hat{\vec{r}}$. The assigned domain reputation $\vec{r}$ for a time step may be used to determine loss. For example, $\hat{\vec{r}}_{t_i}^{d_j}$ can be compared to $\vec{r}_{t_i}^{d_j}$ to determine loss.

According to one embodiment, the multilayer neural network takes an error function of cross entropy loss (equation shown below), which is then used as input for the backpropagation algorithm as described for optimizing recurrent neural networks above.

$$\text{CrossEntropyLoss} = (\hat{\vec{r}} \log(\vec{r}) + (1 - \hat{\vec{r}}) \log(1 - \vec{r})) \qquad [\text{Eqn. 7}]$$

and $$\text{CrossEntropyLoss} = \Sigma_{i=1} \hat{\vec{r}}_i \log(\vec{r}_i) \qquad [\text{Eqn. 8}]$$

for multiclass targets.

In the above equation, the vector $\hat{\vec{r}}$ represents a predicted domain reputation, as may be generated by a domain reputation assignment model, while the $\vec{r}$ vector represents the observed domain reputation generated by user-defined heuristics 714 as input to supervised learning process 701. The various risk factors of a domain profile prediction at each time step are processed by classifier module 701 to produce an overall domain reputation score for each. Put another way, the classifier module 701 can produce a predicted domain reputation for a domain for each time step. When domain reputation assignment model 702 achieves specified criteria (e.g., exhibiting a calculated loss is below a threshold, an accuracy percentage is above a threshold, etc.), it may be considered a trained model usable to predict domain reputations based on real-time sampling.

In addition, or in the alternative, classifier module 701 or neural network implementing the domain reputation assignment model 702 may include a filtering application that may be utilized for automated blocking scenarios, or for contextual classification. The classifier may issue an output that may be used to block or allow traffic to the domain. Alternatively, the filtering application may produce multiclass outputs for example of "low risk", "moderate risk", and "high risk", which may be more useful as many domains contain varying mixtures of legitimate and malicious content. An additional example of multiclass output may be a "WARN" status, that results in displaying a message to the user notifying it of suspicious activity before allowing content to be delivered. For example, a domain may be used to host web content from a large population of users that are both legitimate and malicious actors. In this situation, it may be impossible to block high risk content at the domain level without also blocking all of the legitimate content. Conversely it may also be impossible to allow the legitimate communications on the domain without also allowing the malicious content that is also hosted on the domain.

In some embodiments, the domain profile may also be used with a set of configurable rules, such as in a policy-based security filter. In this kind of application, the network administrator may configure a security policy that implements a set of heuristics to block domains that match user-defined risk criteria that is appropriate for the deployment. For example, one type of policy may read in the various domain profiling risk probabilities from the domain profile or predicted domain profile and implement a zero-tolerance phishing domain policy, while being more lenient towards domains with a relatively unsecure public interface. In another example, a network administrator may decide to only block domains based on historical observations rather than newly observed domains with no history.

In another embodiment, the latent variables of the domain hidden state may be clustered in an unsupervised approach to grouping domains with similar risk profiles close together. One embodiment is illustrated by unsupervised learning process 750 of FIG. 6, where the domain profile hidden state output 752 of the profile predictor 708 may be used by unsupervised learning process 750 to produce a domain clustering model 754 and cluster identifiers 756. Each of the identified clusters may be assigned rich semantic tags, which may serve as a more useful interface for policy-based security filters and security professionals, among other examples. For example, a threat researcher may determine that a certain pattern in behavioral profile captured by the domain clustering model 754 corresponds to a new type of network threat that has not previously been seen. In another example, the threat research may choose to further investigate anomalous domains that have behavioral patterns that do not have any neighbors in the latent feature space or domains that shift membership from one cluster to another.

Due to the architecture of the recurrent neural network, it is even possible to determine the primary individual components that contribute to the weights associated with the highest activations. For example, each state is calculated as a weighted sum of inputs followed by a nonlinear activation. It is then possible to find the weights and inputs that have the highest contribution to the weight sum intermediate that gives rise to the final activation. These inputs correspond to either a set of domain profile features, domain attribute features, or recurrent input from the previous state. When the input corresponds to domain profile features or domain attribute features, it can be inferred that this feature had a large contribution to the resulting activation. As an example, this investigation may show that a particular encoding of certificate issuer has the highest contribution to the predicted high probability of phishing content on the domain. In another example, it may be discovered that the best indicator of malware hosting risk is previous observations of malware hosting on the domain.

Example use cases of embodiments include but are not limited to: predictive risk score on existing domains with a given history as well as on newly created domains, automated blocking on overall combined risk score, automated blocking based on underlying components (e.g., domain name, certificate, behavioral history), policy-based security filters. Domain threat insights provided embodiments may be used, for example, to provide feedback for legitimate domain owners to increase security measures for their domain, provide feedback to users while browsing, provide threat a research tool to discover how threat actors exploit the domain name system to host malicious activity.

It will be appreciated that this domain level approach may have application in other cases outside of the challenges introduced from encrypted communications. For example, another use case may be within a secure DNS protection service, where unwanted content is filtered by the name resolution server, which only has access to the domain name rather than content stored by an associated computing device. Another use case may be as a lightweight scanner in place of a more expensive and time-consuming approach of real-time content scanning. Yet another use case may be for use as a component to feed threat intelligence indicators to a more complex model for detecting specific types of malicious web content, which may lead to more accurate detection of threats when combined with content features, such as in a real-time anti-phishing system.

Figure 8:
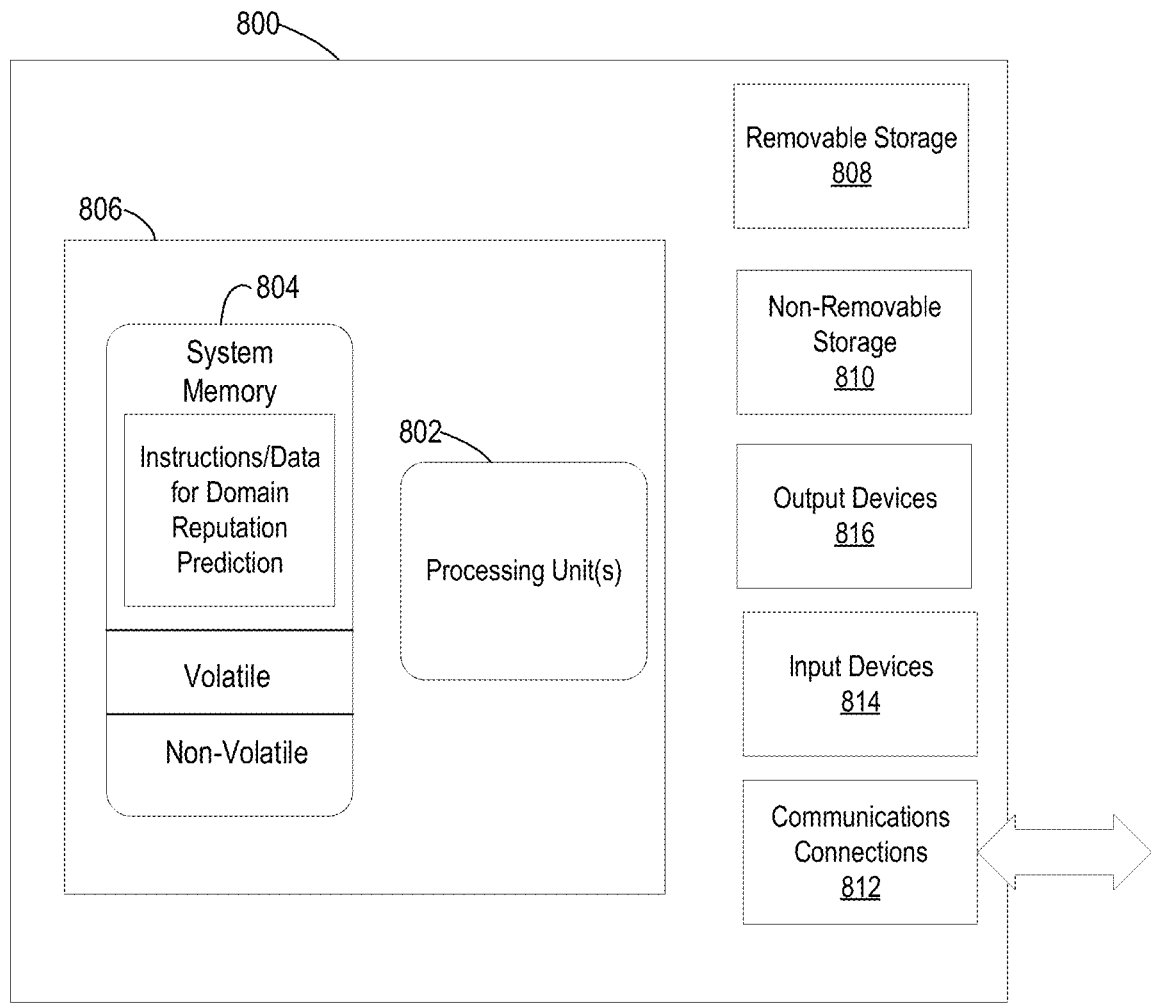
FIG. 8 is a diagrammatic representation of an example operating environment in which one or more of the present embodiments may be implemented.

FIG. 8 illustrates one example of a suitable operating environment 800 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, a domain profile database, a domain attributes database, an attribute feature extractor, a profile feature extractor, a profile prediction trainer, a reputation trainer, instructions to perform the methods disclosed herein, etc.) may be volatile (such as RAM), non-volatile (such as ROM, flash memory, etc.), or some combination of the two. This most basic configuration is illustrated in FIG. 7 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein. By way of example, but not limitation processes and operations described may be embodied in computer code. For example, a high-level computer software language may be used, including, but not limited to C++, Java, C#, and Python. Such computer code can be executed on any of a variety of computer systems, including but not limited to mainframes, servers, and desktops. Such computer systems include non-transitory computer memory that stores instructions derived or otherwise originating from such high-level computer software languages, and CPUs or GPUs that sequentially execute such instructions such that the computer system achieves the operational results described. It will be appreciated that, in other examples, other processing hardware may be used in addition to or as an alternative to aspects described herein, such as FPGAs or TPUs. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple database, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Summary and Abstract) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer system comprising:
   a processor; and
   a memory storing instructions that, when executed by the processor, cause the computer system to perform a set of operations, the set of operations comprising:
   collecting domain attribute data comprising one or more domain attribute features for a domain, the domain attribute features comprising static features associated with the domain;
   collecting sampled domain profile data comprising one or more domain profile features for the domain, the domain profile features comprising behavioral features obtained from historical records indicating a number of threats to users in communication with the domain;
   generating, using the domain attribute data and the sampled domain profile data, a domain reputation assignment utilizing a neural network by:
   generating, using a first neural network, predicted domain profile features across multiple points in time, based on a current observation of domain features, the current observation of domain features including a current observation of the one or more domain attribute features and a current observation of the one or more domain profile features and a recurrent domain state determined by the first neural network; and
   generating, using a second neural network based on the predicted domain profile features generated across the multiple points in time, wherein the second neural network is a trained machine learning model for real-time sampling to evaluate the domain attribute data associated with a domain name that is contemporaneously generated when the domain attribute data is evaluated, a predicted domain reputation for the domain across the multiple points in time; and
   automatically blocking requests for content from the domain based on the generated domain reputation assignment and generating a graphical indication of risk associated with the domain based on the generated predicted domain reputation for the domain.

2. The computer system of claim 1, wherein the sampled domain profile data comprises a set of probabilistic values generated based on:
   statistics of prior observations on the domain;
   responses from active probing of content; and
   security-related aspects of the domain.

3. The computer system of claim 1, wherein the neural network comprises a profile prediction trainer and a reputation trainer.

4. The computer system of claim 1, wherein the one or more domain attribute features comprise one or more attribute features selected from a group consisting of: a domain name, a domain registrar, a domain name server, a domain creation date, an identity of a certificate issuer, a certificate issuance date, a certificate alternate name, a certificate expiration date, a domain IP address, and an associated geographic location.

5. The computer system of claim 1, wherein generating the domain reputation assignment utilizing the neural network comprises:
   generating, using an attribute feature extractor, a set of attribute feature vectors based on the domain attribute data; and
   generating, using a profile feature extractor, a set of profile feature vectors based on the sampled domain profile data.

6. The computer system of claim 1, wherein the one or more domain profile features comprise a user event feature.

7. The computer system of claim 6, wherein the user event feature comprises at least one feature selected from the group consisting of: request volume, number of unique URLs, number of malware threats detected, number of phishing threats detected, number of new threats detected, frequency of malicious activity, and percent of malicious pages.

8. The computer system of claim 1, wherein the one or more domain profile features comprises a probed event feature.

9. The computer system of claim 8, wherein the probed event feature comprises at least one feature selected from the group consisting of: number of unique pages discovered, classification of unique pages discovered, a scan of open network ports and services, an HTTP server process, an HTTP server version, an HTTP header, volatility of hosted content, and network communication latency.

10. A computer program product comprising a non-transitory computer readable medium having embodied thereon instructions executable by a processor for causing a computer to perform a set of operations, the set of operations comprising:
    collecting domain attribute data comprising one or more domain attribute features for a domain, the domain attribute features comprising static features associated with the domain;
    collecting sampled domain profile data comprising one or more domain profile features for the domain, the domain profile features comprising behavioral features obtained from historical records indicating a number of threats to users in communication with the domain; and
    generating, using the domain attribute data and the sampled domain profile data, a domain reputation assignment utilizing a neural network by:
        generating, using a first neural network, predicted domain profile features across multiple points in time, based on a current observation of domain features, the current observation of domain features including a current observation of the one or more domain attribute features and a current observation of the one or more domain profile features and a recurrent domain state determined by the first neural network; and
        generating, using a second neural network based on the predicted domain profile features generated across the multiple points in time, wherein the second neural network is a trained machine learning model for real-time sampling to evaluate the domain attribute data associated with a domain name that is contemporaneously generated when the domain attribute data is evaluated, a predicted domain reputation for the domain across the multiple points in time; and
    automatically blocking requests for content from the domain based on the generated domain reputation assignment and generating a graphical indication of risk associated with the domain based on the generated predicted domain reputation for the domain.

11. The computer program product of claim 10, wherein the sampled domain profile data comprises a set of probabilistic values generated based on:
    statistics of prior observations on the domain;
    responses from active probing of content; and
    security-related aspects of the domain.

12. The computer program product of claim 10, wherein the neural network comprises a profile prediction trainer and a reputation trainer.

13. The computer program product of claim 10, wherein the one or more domain attribute features comprise one or more attribute features selected from a group consisting of: a domain name, a domain registrar, a domain name server, a domain creation date, an identity of a certificate issuer, a certificate issuance date, a certificate alternate name, a certificate expiration date, a domain IP address, and an associated geographic location.

14. The computer program product of claim 10, wherein generating the domain reputation assignment utilizing the neural network comprises:
    generating, using an attribute feature extractor, a set of attribute feature vectors based on the domain attribute data; and
    generating, using a profile feature extractor, a set of profile feature vectors based on the sampled domain profile data.

15. The computer program product of claim 10, wherein the one or more domain profile features comprises a user event feature.

16. The computer program product of claim 15, wherein the user event feature comprises at least one feature selected from the group consisting of: request volume, number of unique URLs, number of malware threats detected, number of phishing threats detected, number of new threats detected, frequency of malicious activity, and percent of malicious pages.

17. The computer program product of claim 10, wherein the one or more domain profile features comprises a probed event feature.

18. The computer program product of claim 17, wherein the probed event feature comprises at least one feature selected from the group consisting of: number of unique pages discovered, classification of unique pages discovered, a scan of open network ports and services, an HTTP server process, an HTTP server version, an HTTP header, volatility of hosted content, and network communication latency.

19. A method comprising:
    collecting, by a computer system, domain attribute data comprising one or more domain attribute features for a domain, the domain attribute features comprising static features associated with the domain;
    collecting, by the computer system, sampled domain profile data comprising one or more domain profile features for the domain, the domain profile features comprising behavioral features obtained from historical records indicating a number of threats to users in communication with the domain; and
    generating, by the computer system, using the domain attribute data and the sampled domain profile data, a domain reputation assignment utilizing a neural network by:
        generating, using a first neural network, predicted domain profile features across multiple points in time, based on a current observation of domain features, the current observation of domain features including a current observation of the one or more domain attribute features and a current observation of the one or more domain profile features and a recurrent domain state determined by the first neural network; and
        generating, using a second neural network based on the predicted domain profile features generated across the multiple points in time, wherein the second neural network is a trained machine learning model for real-time sampling to evaluate the domain attribute data associated with a domain name that is contemporaneously generated when the domain attribute data is evaluated, a predicted domain reputation for the domain across the multiple points in time; and
    automatically blocking requests for content from the domain based on the generated domain reputation assignment and generating a graphical indication of risk associated with the domain based on the generated predicted domain reputation for the domain.

* * * * *